United States Patent
Nishio et al.

(10) Patent No.: US 8,576,770 B2
(45) Date of Patent: Nov. 5, 2013

(54) WIRELESS COMMUNICATION BASE STATION DEVICE, WIRELESS COMMUNICATION TERMINAL, AND CONTROL INFORMATION CREATION METHOD

(75) Inventors: Akihiko Nishio, Kanagawa (JP); Seigo Nakao, Kanagawa (JP); Yoshiko Saito, Kanagawa (JP); Alexander Golitschek Edler von Elbwart, Darmstadt (DE)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 13/058,151

(22) PCT Filed: Aug. 10, 2009

(86) PCT No.: PCT/JP2009/003841
§ 371 (c)(1),
(2), (4) Date: Feb. 8, 2011

(87) PCT Pub. No.: WO2010/018684
PCT Pub. Date: Feb. 18, 2010

(65) Prior Publication Data
US 2011/0141998 A1    Jun. 16, 2011

(30) Foreign Application Priority Data
Aug. 11, 2008  (JP) .................. 2008-207369

(51) Int. Cl.
*H04B 7/212*  (2006.01)
(52) U.S. Cl.
USPC ............................................ 370/322; 370/344
(58) Field of Classification Search
USPC ......... 370/344, 345, 347, 349, 278, 282, 294, 370/295, 219, 310.2, 322, 321, 326, 328, 370/330, 337
See application file for complete search history.

(56) References Cited

U.S. PATENT DOCUMENTS

| | | | | |
|---|---|---|---|---|
| 2009/0232062 | A1* | 9/2009 | Higuchi et al. | 370/329 |
| 2010/0195583 | A1* | 8/2010 | Nory et al. | 370/329 |
| 2011/0092242 | A1* | 4/2011 | Parkvall et al. | 455/509 |
| 2011/0194514 | A1* | 8/2011 | Lee et al. | 370/329 |

FOREIGN PATENT DOCUMENTS

JP   2008-172366   7/2008

OTHER PUBLICATIONS

International Search Report dated Nov. 2, 2009.

(Continued)

*Primary Examiner* — Brenda H Pham
(74) *Attorney, Agent, or Firm* — Dickinson Wright PLLC

(57) ABSTRACT

Disclosed is a wireless communication base station device capable of reducing the power consumption of a terminal when broadband transmission is performed with only an uplink. With this device, a setting unit (101) sets mutually different terminal IDs per a plurality of uplink unit bands for a terminal (200) that communicates using a plurality of uplink unit bands and prescribed downlink unit bands which are fewer in number than the uplink unit bands; a control unit (102) that respectively allocates resource allocation information per a plurality of uplink unit bands to a PDCCH arranged in a prescribed downlink unit band; and a PDCCH creation unit (103) that creates a PDCCH signal by respectively masking the resource allocation information per a plurality of uplink unit bands with the terminal ID that has been set per a plurality of uplink unit bands.

12 Claims, 15 Drawing Sheets

(56) References Cited

OTHER PUBLICATIONS

3GPP TSG RAN WG1 Meeting #55, "Considerations on DL/UL Transmission in Asymmetric Carrier Aggregation," LG Electronics, R1-084197, Nov. 2008, pp. 1-5.

3GPP TS 36.211 V8.3.0, "Evolved Universal Terrestrial Radio Access (E-UTRA); Physical Channels and Modulation (Release 8)," May 2008, pp. 1-77.

3GPP TS 36.212 V8.3.0, "Evolved Universal Terrestrial Radio Access (E-UTRA); Multiplexing and channel coding," May 2008, pp. 1-48.

3GPP TS 36.213 V8.3.0, "Evolved Universal Terrestrial Radio Access (E-UTRA); Physical layer procedures (Release 8)," May 2008, pp. 1-45.

TSG-RAN WG1 #53bis, "Carrier aggregation in LTE-Advanced," Ericsson, R1-082468, Jun. 30-Jul. 4, 2008, pp. 1-6.

* cited by examiner

| TERMINAL | COMPONENT BAND | TERMINAL ID |
|---|---|---|
| 1 | 1 | #a |
|   | 2 | #b |
| 2 | 1 | #c |
|   | 2 | #d |
| 3 | 1 | #e |
| 4 | 1 | #f |
|   | 2 | #g |

FIG. 5

WIRELESS COMMUNICATION BASE STATION DEVICE, WIRELESS COMMUNICATION TERMINAL, AND CONTROL INFORMATION CREATION METHOD

TECHNICAL FIELD

The present invention relates to a radio communication base station apparatus, a radio communication terminal apparatus and a control information generating method.

BACKGROUND ART

3GPP-LTE (3rd Generation Partnership Project Radio Access Network Long Term Evolution) adopts OFDMA (Orthogonal Frequency Division Multiple Access) as a downlink communication scheme, and SC-FDMA (Single Carrier Frequency Division Multiple Access) as an uplink communication scheme (for example, see Non-Patent Literatures 1, 2 and 3.)

With LTE, a radio communication base station apparatus (hereinafter abbreviated as "base station") communicates with radio communication terminal apparatuses (hereinafter abbreviated as "terminals") by assigning resource blocks (RBs) in the system band to terminals, per time unit referred to as subframe. In addition, a base station transmits control information to notify, to terminals, the result of assignment of resources for downlink data and uplink data.

This control information is transmitted to terminals using downlink control channels, for example, PDCCHs (physical downlink control channels.) Here, LTE supports a frequency band having the maximum width of 20 MHz as the system bandwidth.

In addition, a base station transmits a plurality of PDCCHs at the same time to assign a plurality of terminals to one subframe. At this time, the base station transmits a PDCCH including CRC bits masked (scrambled) with a destination terminal ID to identify each PDCCH destination terminal. Then, a terminal performs blind-decoding on a plurality of PDCCHs which may be directed to the terminal by demasking (or descrambling) CRC bits in the plurality of PDCCHs, with its terminal ID to detect the PDCCH directed to the terminal.

In addition, standardization of 3GPP LTE-Advanced that realizes faster communication than by LTE has been started. With LTE-Advanced, in order to realize a downlink transmission speed equal to or higher than the maximum 1 Gbps and an uplink transmission speed equal to or higher than the maximum 500 Mbps, base stations and terminals (hereinafter "LTE+ terminals") that are able to communicate with each other at a wideband frequency equal to or higher than 40 MHz, will be employed. In addition, an LTE-Advanced system is required to accommodate not only LTE+ terminals but also terminals (hereinafter "LTE terminals") supporting an LTE system.

In addition, with LTE-Advanced, a band aggregation scheme for communication by connecting a plurality of frequency bands, is proposed. Here, a base unit of communication bands (hereinafter "component bands") is a frequency band having a width of 20 MHz. Therefore, LTE-Advanced realizes a system bandwidth of 40 MHz by connecting two component bands.

In addition, with LTE-Advanced, studies are underway to associate component bands in the uplink (hereinafter "uplink component bands") with component bands in the downlink (hereinafter "downlink component bands") one by one (e.g. Non-Patent Literature 4.) That is, a base station notifies resource assignment information about each component band to terminals using the downlink component band in each component band. For example, a terminal that performs transmission in a wideband of 40 MHz (terminal using two component bands) acquires resource assignment information about two component bands by receiving PDCCHs allocated to the downlink component band in each component band. Therefore, in an LTE-Advanced system, a base station can notify resource assignment information per component band, to terminals in both cases where one component band is used (for example, in a case of communication with LTE terminals supporting a band of 20 MHz), and where a plurality of component bands are used (for example, in a case of communication with LTE+ terminals supporting a band of 40 MHz.) That is, a base station can use the same notifying method between LTE terminals and LTE+ terminals, so that it is possible to construct a simple system.

CITATION LIST

Non-Patent Literature

[NPL 1] 3GPP TS 36.211 V8.3.0, "Physical Channels and Modulation (Release 8)," May 2008
[NPL 2] 3GPP TS 36.212 V8.3.0, "Multiplexing and channel coding (Release 8)," May 2008
[NPL 3] 3GPP TS 36.213 V8.3.0, "Physical layer procedures (Release 8)," May 2008
[NPL 4] 3GPP TSG RAN WG1 meeting, R1-082468, "Carrier aggregation LTE-Advanced," July 2008

SUMMARY OF INVENTION

Technical Problem

In a terminal, when a frequency bandwidth of received signals is wider, power consumption increases. Therefore, power consumption of a terminal that performs wideband transmission (for example, communication band of 40 MHz) is greater than that of a terminal that performs narrowband communication (for example, communication band of 20 MHz.) Therefore, minimization of power consumption of a terminal is possible by adaptively controlling the number of component bands to be connected, according to the transmission amount (or transmission speed) of data.

To be more specific, when the amount of transmission data is greater, the number of component bands to be connected increases.

Here, with LTE-Advanced, it is expected that the amount of transmission data in the uplink and the amount of transmission data in the downlink are independent of one another. For example, there may be a case where wideband transmission (in a communication band of 40 MHz) is performed in the uplink while narrowband transmission (in a communication band of 20 MHz) is performed in the downlink. That is, there may be a case where, for example, two uplink component bands are used in the uplink and only one downlink component band is used in the downlink.

However, with the above-described prior art, uplink component bands are associated with downlink component bands one by one. That is, resource assignment information indicating resources in an uplink component band to assign uplink data from a terminal to, is notified using the downlink component band associated with that uplink component band. Therefore, even if wideband transmission (for example, in a communication band of 40 MHz) is performed only in the uplink, that is, even if both the uplink component band and the downlink component band are used in one of two component bands used by a terminal while only the uplink component band is used in the other component band, the terminal has to receive PDCCHs using the downlink component bands associated with respective uplink component bands to notify resource assignment information about each uplink component band.

For example, a case in which a terminal uses two component bands (component band 1 and component band 2) will be explained. When wideband transmission (for example, in a communication band of 40 MHz) is performed only in the uplink, a terminal uses, for example, uplink component bands in both component band 1 and component band 2. Meanwhile, in the downlink, the terminal performs narrowband transmission (for example, in a communication band of 20 MHz) by using only the downlink component band in component band 1, not using the downlink component band in component band 2. Here, the terminal has to receive uplink resource assignment information indicating assignment of resources in the uplink component band in component band 2, using PDCCHs allocated to the downlink component band in component band 2. Therefore, although the terminal does not use the downlink component band in component band 2 for data transmission, the terminal needs to receive PDCCHs allocated to the downlink component band in component band 2.

That is, although narrowband transmission (for example, in a communication band of 20 MHz) is performed in the downlink, a terminal needs to receive wideband signals (for example, signals in a communication band of 40 MHz) even in the downlink, and consequently, power consumption of the terminal increases.

It is therefore an object of the present invention to provide a base station, a terminal and a control information generating method to reduce power consumption of terminals even if wideband transmission is performed only in the uplink.

Solution to Problem

The base station according to the present invention adopts a configuration to include: a configuration section that configures varying terminal IDs between a plurality of uplink component bands, for a radio communication terminal apparatus that performs communication using the plurality of uplink component bands and a smaller number of specific downlink component bands than a number of the plurality of uplink component bands; a control section that assigns resource assignment information about each of the plurality of uplink component bands, to control channels allocated to a specific downlink component band; and a generating section that generates control information by masking the resource assignment information about each of the plurality of uplink component bands, with a terminal ID configured for each of the plurality of uplink component band.

The terminal according to the present invention that performs communication using a plurality of uplink component bands and a smaller number of specific downlink component bands than a number of the plurality of uplink component bands adopts a configuration to include: a blind-decoding section that obtains resource assignment information about each of the plurality of uplink component bands, which is directed to the radio communication terminal apparatus, by demasking control channels allocated to a specific downlink component band, with terminal IDs respectively configured for the plurality of uplink component bands; and a mapping section that maps uplink data to the plurality of uplink component bands, according to the resource assignment information about each of the plurality of uplink component bands.

The control information generating method according to the present invention includes: configuring varying terminal IDs between a plurality of uplink component bands, for a radio communication terminal apparatus that performs communication using the plurality of uplink component bands and a smaller number of specific downlink component bands than a number of the plurality of uplink component bands; controlling to assign resource allocation information about each of the plurality of uplink component bands, to control channels allocated to a specific downlink component band; and generating control information by masking the resource assignment information about each of the plurality of uplink component bands, with a terminal ID configured for each of the plurality of uplink component bands.

Advantageous Effects of Invention

According to the present invention, even if wideband transmission is performed only in the uplink, it is possible to reduce power consumption of terminals.

BRIEF DESCRIPTION OF DRAWINGS

FIG. 5 shows an example of component bands and terminal IDs configured for each terminal according to Embodiment 1 of the present invention.

DESCRIPTION OF EMBODIMENTS

Figure 1:
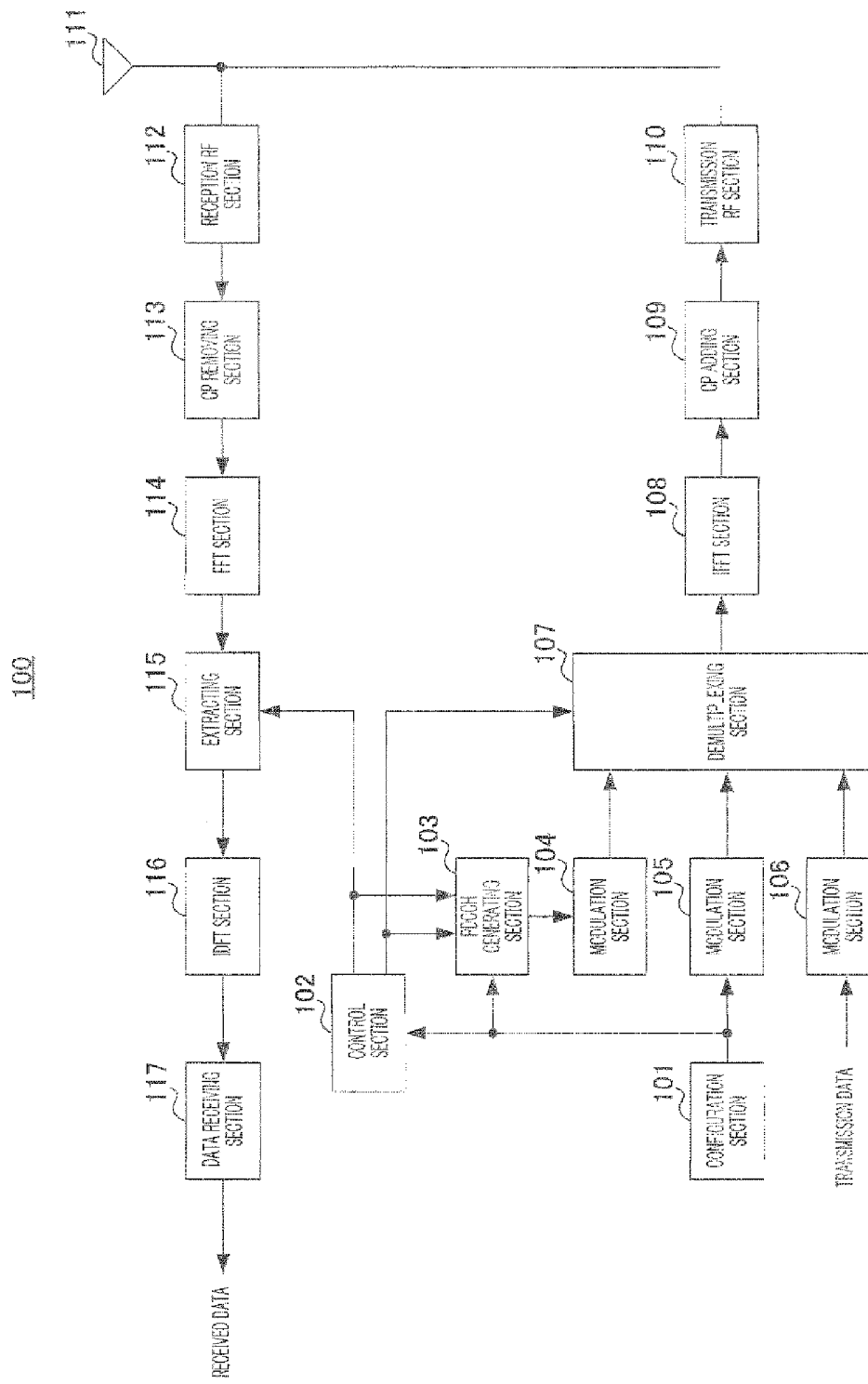
FIG. 1 is a block diagram showing a configuration of a base station according to Embodiment 1 of the present invention.

Now, embodiments of the present invention will be described in detail with reference to the accompanying drawings. Here, in embodiments, the same components are assigned the same reference numerals and overlapping descriptions will be omitted.

Embodiment 1

FIG. 1 is a block diagram showing a configuration of base station 100 according to the present embodiment.

In base station 100 shown in FIG. 1, configuration section 101 configures one or more component bands used in the uplink and the downlink, per terminal, for example, according to a required transmission rate or transmission amount of data. In addition, configuration section 101 configures varying terminal IDs between component bands, for each terminal. To be more specific, configuration section 101 configures different terminal IDs for a plurality of component bands, respectively, where one uplink component band and one downlink component band are associated with one another in a component band, and either an uplink component band or a downlink component band is configured for a terminal. Then, configuration section 101 outputs configuration information indicating component bands configured for each terminal and terminal IDs configured for respective component bands, to control section 102, PDCCH generating section 103 and modulation section 105.

Control section 102 generates uplink resource assignment information indicating uplink resources (e.g. PUSCHs (physical uplink shared channels)) to assign uplink data from terminals to, and generates downlink resource assignment information indicating downlink resources (e.g. PDSCHs (physical downlink shared channels)) to assign downlink data directed to terminals to. Then, control section 102 outputs uplink resource assignment information to PDCCH generating section 103 and extracting section 115, and outputs downlink resource assignment information to PDCCH generating section 103 and multiplexing section 107. Here, control section 102 assigns uplink resource assignment information and downlink resource assignment information to PDCCHs allocated to downlink component bands configured for respective terminals, based on configuration information inputted from configuration section 101. To be more specific, control section 102 assigns downlink resource assignment information to PDCCHs allocated to the downlink component band that is targeted for resource assignment and indicated by the downlink resource assignment information. In addition, control section 102 assigns uplink resource assignment information to PDCCHs allocated to the downlink component band associated with the uplink component band that is targeted for resource assignment and indicated by the uplink resource assignment information. Here, when no downlink component band associated with the uplink component band that is targeted for resource assignment and indicated by uplink resource assignment information, is configured for a terminal, control section 102 assigns uplink resource assignment information to PDCCHs allocated to a specific downlink component band, among downlink component bands configured for the terminal, which is closest to the downlink component band associated with the uplink component band that is targeted for resource assignment and indicated by the uplink resource assignment information. Here, assignment control processing in control section 102 will be described in detail later.

PDCCH generating section 103 generates PDCCH signals including uplink resource assignment information and downlink resource assignment information inputted from control section 102. In addition, PDCCH generating section 103 adds CRC bits to PDCCH signals to which uplink resource assignment information and downlink resource assignment information are assigned, and masks (or scrambles) the CRC bits with terminal IDs. Here, PDCCH generating section 103 masks CRC bits added to each resource assignment information, with the terminal ID configured per component band that is targeted for resource assignment and indicated by each resource assignment information. Then, PDCCH generating section 103 outputs a PDCCH signal after masking to modulation section 104.

After channel coding, modulation section 104 modulates the PDCCH signal inputted from PDCCH generating section 103 and outputs a PDCCH signal after modulation to multiplexing section 107.

Modulation section 105 modulates configuration information inputted from configuration section 101 and outputs configuration information after modulation to multiplexing section 107.

After channel coding, modulation section 106 modulates inputted transmission data (downlink data) and outputs a transmission data signal after modulation to multiplexing section 107.

Multiplexing section 107 multiplexes a PDCCH signal inputted from modulation section 104, configuration information inputted from modulation section 105 and a data signal (i.e. PDSCH signal) inputted from modulation section 106. Here, multiplexing section 107 maps the PDCCH signal and data signal (PDSCH signal) to each downlink component band, based on downlink resource assignment information inputted from control section 102. Here, multiplexing section 107 may map configuration information to PDSCHs.

IFFT (inverse fast Fourier transform) section 108 transforms a multiplexed signal to a time domain waveform, and CP (cyclic prefix) adding section 109 adds a CP to this time domain waveform to obtain an OFDM signal.

Transmission RF section 110 applies transmission radio processing (up-conversion, digital-to-analog (D/A) conversion and so forth) to the OFDM signal inputted from CP adding section 109, and transmits the result via antenna 111.

Meanwhile, reception RF section 112 applies reception radio processing (down-conversion, analog-to-digital (A/D) conversion and so forth) to a reception radio signal received in a reception band via antenna 111, and outputs a resulting reception signal to CP removing section 113.

CP removing section 113 removes a CP from a received signal, and FFT (inverse fast Fourier transform) section 114 transforms a received signal without a CP to a frequency domain signal.

Extracting section 115 extracts uplink data from the frequency domain signal inputted from FFT section 114, based on uplink resource assignment information inputted from control section 102. IDFT (inverse discrete Fourier transform) section 116 transforms an extracted signal to a time domain signal and outputs the time domain signal to data receiving section 117.

Data receiving section 117 decodes the time domain signal inputted from IDFT section 116. Then, data receiving section 117 outputs uplink data after decoding as received data.

Figure 2:
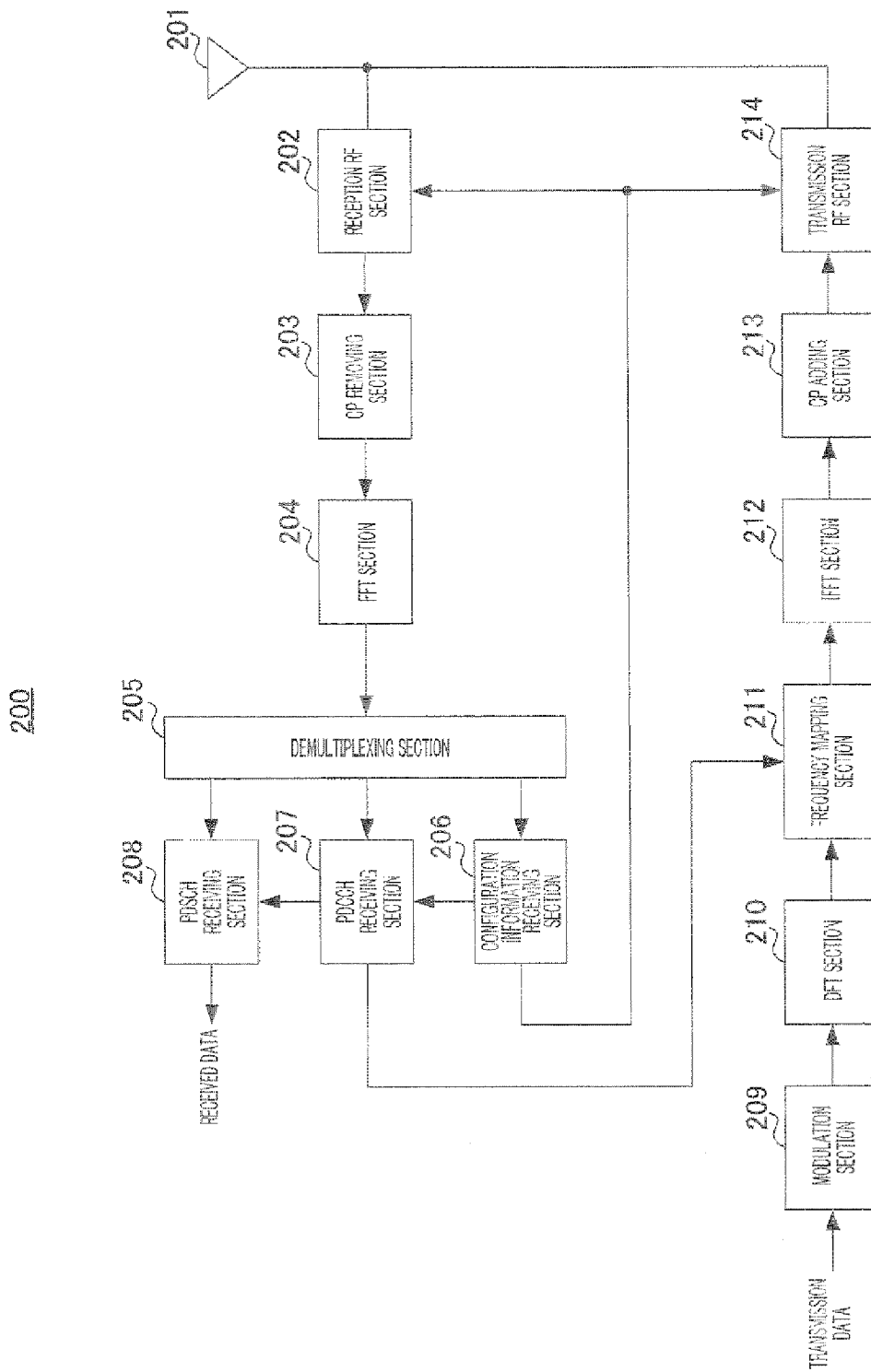
FIG. 2 is a block diagram showing a configuration of a terminal according to Embodiment 1 of the present invention.

FIG. 2 is a block diagram showing a configuration of terminal 200 according to the present embodiment. Terminal 200 is able to perform communication, using a plurality of uplink component bands and a smaller number of specific downlink component bands than the number of the plurality of uplink component bands.

In terminal 200 shown in FIG. 2, reception RF section 202 is formed with a reception band which can be changed, and changes its reception band based on band information inputted from configuration information receiving section 206. Then, reception RF section 202 applies reception radio processing (down-conversion, analog-to-digital (A/D) conversion and so forth) to a reception radio signal (OFDM signal here) received in the reception band via antenna 201, and outputs a resulting received signal to CP removing section 203.

CP removing section 203 removes a CP from the received signal, and FFT section 204 transforms a received signal without a CP to a frequency domain signal. This frequency domain signal is outputted to demultiplexing section 205.

Demultiplexing section 205 demultiplexes the signal inputted from FFT section 204 into a high-layer control signal (e.g. RRC signaling) including configuration information, a PDCCH signal and a data signal (i.e. PDSCH signal.) Then, demultiplexing section 205 outputs control information to configuration information receiving section 206, outputs a PDCCH signal to PDCCH receiving section 207, and outputs a PDSCH signal to PDSCH receiving section 208.

Configuration information receiving section 206 reads information indicating uplink component bands and downlink component bands configured for terminal 200, from a control signal inputted from demultiplexing section 205, and outputs the read information to PDCCH receiving section 207, reception RF section 202 and transmission RF section 214, as band information. In addition, configuration information receiving section 206 reads information indicating respective terminal IDs of component bands, which are configured for terminal 200, from a control signal inputted from demultiplexing section 205, and outputs the read information to PDCCH receiving section 207, as terminal ID information.

PDCCH receiving section 207 performs blind-decoding on a PDCCH signal inputted from demultiplexing section 205. Here, PDCCH signals are allocated downlink component bands, respectively, which are configured for terminal 200 and indicated by band information inputted from configuration information receiving section 206. PDCCH receiving section 207 demodulates and decodes a PDCCH signal inputted from demultiplexing section 205, and, when a PDCCH signal after decoding indicates that CRC=OK (there is no error) by demasking CRC bits with terminal IDs of terminal 200 indicated by terminal ID information inputted from configuration information receiving section 206, determines the PDCCH signal is directed to terminal 200. Here, when a plurality of component bands are configured for terminal 200, varying terminal IDs between component bands are assigned. PDCCH receiving section 207 acquires resource assignment information about a subject component band by performing the above blind-decoding using respective terminal IDs of component bands to transmit PDCCH signals. In addition, when an uplink component band in which the associated downlink component band is not configured (unconfigured) is configured in terminal 200, PDCCH receiving section 207 performs blind-decoding on the PDCCH allocated to the specific downlink component band closest to the downlink component band associated with that uplink component band, with the terminal ID configured for that uplink component band. That is, PDCCH receiving section 207 determines resource assignment information obtained by demasking the terminal ID configured per component band, as resource assignment information for the component band. Then, PDCCH receiving section 207 outputs downlink resource assignment information included in the PDCCH signal directed to terminal 200, to PDSCH receiving section 208, and outputs uplink resource assignment information to frequency mapping section 211.

PDSCH receiving section 208 extracts received data from a PDSCH signal inputted from demultiplexing section 205, based on the downlink resource assignment information inputted from PDCCH receiving section 207.

Modulation section 209 modulates transmission data (uplink data) and outputs a resulting modulated signal to DFT (discrete Fourier transform) section 210.

DFT section 210 transforms the modulated signal inputted from modulation section 209, to a frequency domain signal, and outputs a plurality of resulting frequency components to frequency mapping section 211.

Frequency mapping section 211 maps the plurality of frequency components inputted from DFT section 210, to PUSCHs allocated to uplink component bands, according to uplink resource assignment information inputted from PDCCH receiving section 207.

Here, modulation section 209, DFT section 210 and frequency mapping section 211 may be provided per component band.

IFFT section 212 transforms the plurality of frequency components mapped to PUSCHs to a time domain waveform, and CP adding section 213 adds a CP to this time-domain waveform.

Transmission RF section 214 is formed with a transmission band which can be changed, and configures its transmission band, based on band information inputted from configuration information receiving section 206. Then, transmission RF section 214 applies transmission radio processing (up-conversion, digital-to-analog (D/A) conversion and so forth) to a signal with a CP, and transmits the result via antenna 201.

Next, operations of base station 100 and terminal 200 will be explained in detail.

Figure 3:
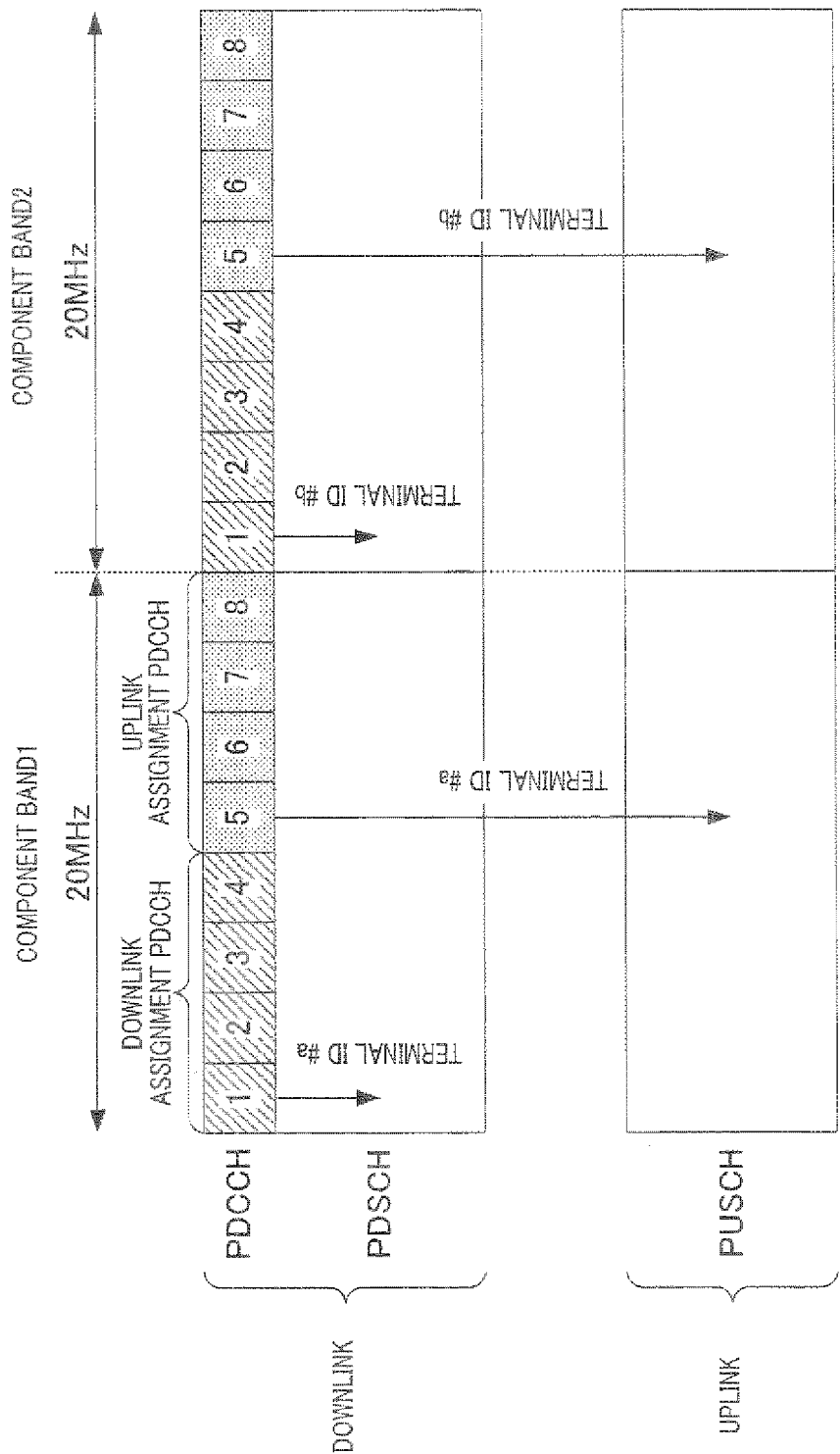
FIG. 3 shows configuration of terminal IDs according to Embodiment 1 of the present invention.

In the following descriptions, as shown in FIG. 3, base station 100 and terminal 200 use PDCCHs and PDSCHs allocated to respective downlink component bands in component band 1 and component band 2 each having a communication bandwidth of 20 MHz, and PUSCHs allocated to uplink component bands. In addition, as shown in FIG. 3, one downlink component band and one uplink component band are associated with one another in each component band. To be more specific, as shown in FIG. 3, in each of component bands 1 and 2, one downlink component band including PDCCHs and PDSCHs and one uplink component band including PUSCHs are associated with one another. In addition, here, as shown in FIG. 3, in each downlink component band, eight PDCCHs (PDCCHs 1 to 8) are used, PDCCHs 1 to 4 are used as downlink assignment PDCCHs, which are PDCCHs for downlink assignment, and PDCCHs 5 to 8 are used as uplink assignment PDCCHs, which are PDCCHs for uplink assignment.

Figure 4:
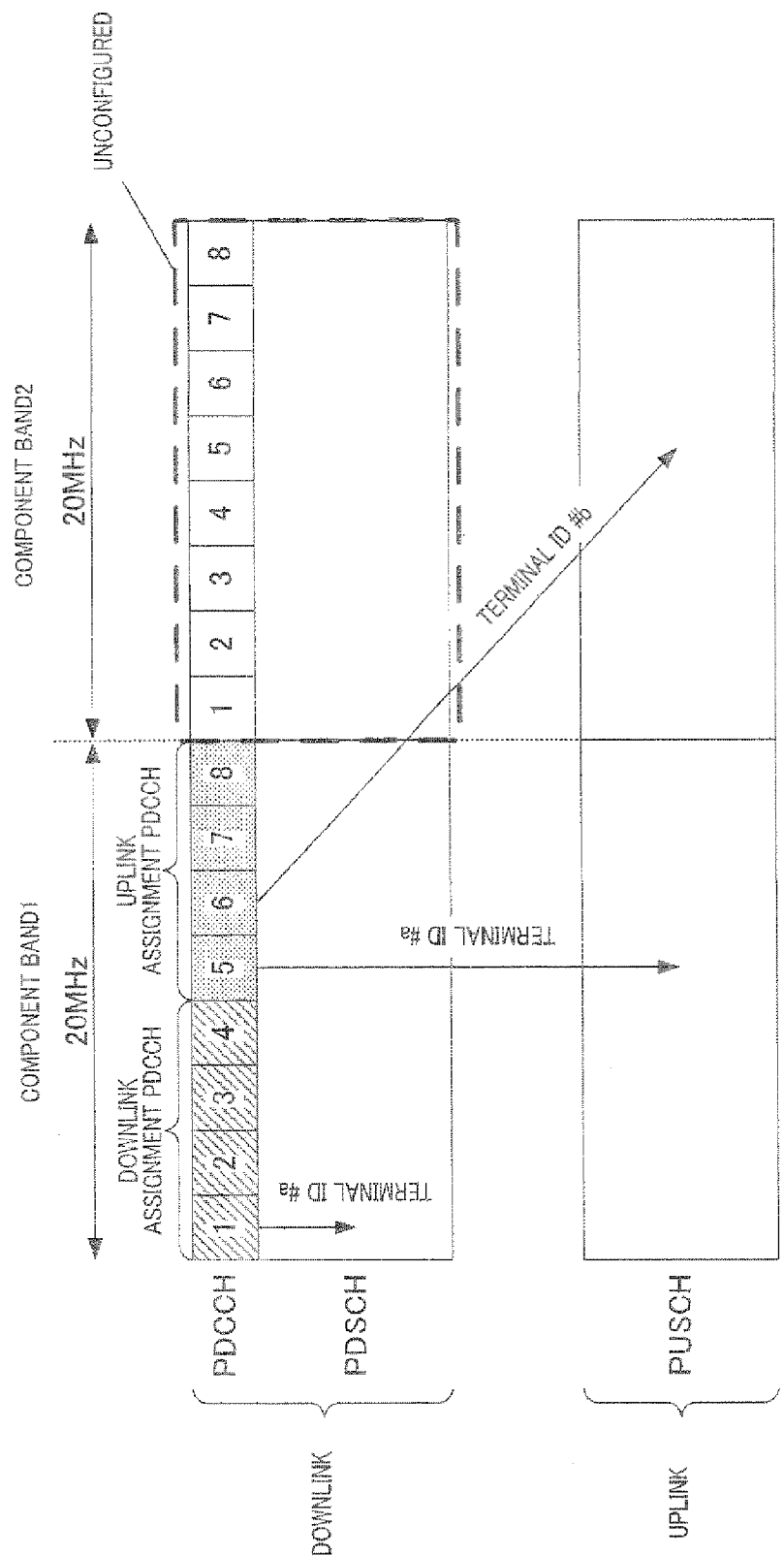
FIG. 4 shows configuration of terminal IDs according to Embodiment 1 of the present invention.

Configuration section 101 in base station 100 configures uplink component bands and downlink component bands per terminal. For example, when terminal 200 performs high-speed data communication in both the uplink and the downlink, that is, wideband transmission (that is, transmission in a communication band of 40 MHz), configuration section 101 configures two uplink component bands and two downlink component bands for terminal 200, as shown in FIG. 3. Meanwhile, when terminal 200 performs wideband transmission only in the uplink (that is, performs narrowband transmission in the downlink), configuration section 101 configures two uplink component bands and one downlink component band (component band 1) for terminal 200, as shown in FIG. 4. That is, as shown in FIG. 4, while configuration section 101 configures both an uplink component band and a downlink component band in component 1, for terminal 200, configuration section 101 configures only an uplink component band without configuring (unconfiguring) a downlink component band in component band 2, for terminal 200. That is, base station 100 and terminal 200 perform communication, using two uplink component bands and one specific downlink component band smaller in number than the uplink component band.

In addition, configuration section 101 configures varying terminal IDs between component bands configured for terminal 200. That is, for terminal 200, configuration section 101 configures a plurality of terminal IDs corresponding to the number of component bands configured for terminal 200. For example, as shown in FIG. 3 and FIG. 4, configuration section 101 configures terminal ID #a and terminal ID #b for component 1 and component band 2 configured for terminal 200, respectively.

Here, component bands for each terminal, which are configured by configuration section 101, and respective terminal IDs of component bands configured for each terminal, are notified to each terminal, using control channels or PDSCHs. Here, an example of configuration of terminal IDs will be shown in FIG. 5. In FIG. 5, configuration section 101 configures two component bands (component bands 1 and 2) for terminal 1, 2 and 4, and configures one component band (component band 1) for terminal 3. In addition, configuration section 101 configures terminal ID #a and terminal ID #b for component band 1 and component band 2 configured for terminal 1, respectively. Likewise, configuration section 101 configures terminal ID #c and terminal ID #d for component band 1 and component band 2 configured for terminal 2, respectively. The same applies to terminal 4. Meanwhile, configuration section 101 configures terminal ID #e for component band 1 configured for terminal 3. Here, when the number of uplink component bands differs from the number of downlink component bands, configuration section 101 configures terminal IDs, according to the number of component bands configured more. For example, when the number of uplink component bands is greater than the number of downlink component bands, as in a case in which wideband transmission is performed only in the uplink, configuration section 101 configures varying terminal IDs between uplink component bands.

Next, control section 102 assigns downlink resource assignment information and uplink resource assignment information to PDCCHs in each component band. For example, as shown in FIG. 3, control section 102 assigns downlink resource assignment information indicating assignment of PDSCHs in component band 1, to PDCCH 1, among downlink assignment PDCCHs 1 to 4 in component band 1. Meanwhile, control section 102 assigns downlink resource assignment information indicating assignment of PDSCHs in component band 2, to PDCCH 1, among downlink assignment PDCCHs 1 to 4 in component band 2. The same applies to assignment of downlink resource assignment information in FIG. 4.

In addition, as shown in FIG. 3, when wideband transmission is performed in both the uplink and the downlink, control section 102 assigns uplink resource assignment information indicating assignment of PUSCHs in component band 1, to PDCCH 5, among uplink assignment PDCCHs 5 to 8 in component band 1. Meanwhile, control section 102 assigns uplink resource assignment information indicating assignment of PUSCHs in component band 2, to PDCCH 5, among uplink assignment PDCCHs 5 to 8 in component band 2.

On the other hand, as shown in FIG. 4, when wideband transmission is performed only in the uplink (when uplink component bands and downlink component bands are not symmetric), control section 102 assigns uplink resource assignment information indicating assignment of PUSCHs in the uplink component band associated with an unconfigured downlink component band (downlink component band in component band 2 in FIG. 4), to PDCCHs in the uplink component band (uplink component band in component band 1 in FIG. 4) closest to the unconfigured uplink component band. To be more specific, as shown in FIG. 4, control section 102 assigns uplink resource assignment information indicating assignment of PUSCHs in component band 2, to PDCCH 6, among uplink assignment PDCCHs 5 to 8 in component band 1 neighboring component band 2.

Next, PDCCH generating section 103 masks CRC bits added to resource assignment information directed to terminal 200, with terminal IDs configured on a per component band basis. To be more specific, as shown in FIG. 3, when wideband transmission is performed in both the uplink and the downlink, PDCCH generating section 103 masks CRC bits added to downlink resource assignment information assigned to PDCCH 1 in component band 1 and uplink resource assignment information assigned to PDCCH 5 in component band 1, with terminal ID #a configured for component band 1. Likewise, PDCCH generating section 103 masks CRC bits added to downlink resource assignment information assigned to PDCCH 1 in component band 2 and uplink resource assignment information assigned to PDCCH 5 in component band 2, with terminal ID #b configured for component band 2.

On the other hand, as shown in FIG. 4, when wideband transmission is performed only in the uplink, PDCCH generating section 103 masks CRC bits added to downlink resource assignment information about component band 1 assigned to PDCCH 1 in component band 1, and uplink resource assignment information about component band 1 assigned to PDCCH 5 in component band 1, with terminal ID #a configured for component band 1. Meanwhile, PDCCH generating section 103 masks CRC bits added to uplink resource assignment information about component band 2, which is assigned to PDCCH 6 in component band 1, with terminal ID #b configured for component band 2. That is, PDCCH generating section 103 masks CRC bits added to resource assignment information, with the terminal ID configured for a component band targeted for resource assignment, which is indicated by this resource assignment information.

Configuration information receiving section 206 in terminal 200 determines whether terminal 200 performs wideband transmission in both the uplink and the downlink, or only in the downlink, based on configuration information notified from base station 100. In addition, when two downlink component bands are configured in the downlink as shown in FIG. 3, configuration information receiving section 206 configures a reception bandwidth of 40 MHz for reception RF section 202, and, when one downlink component band is configured in the downlink as shown in FIG. 4, configures a reception bandwidth of 20 MHz for reception RF section 202. The same applies to transmission bandwidths in transmission RF section 214.

PDCCH receiving section 207 performs blind-decoding on PDCCH signals allocated to downlink component bands configured for terminal 200, using terminal IDs configured on a per component band basis. For example, in FIG. 3, downlink component bands in component band 1 and component band 2 are configured for terminal 200, as the downlink. Therefore, PDCCH receiving section 207 determines that PDCCH 1 (downlink resource assignment information) and PDCCH 5 (uplink resource assignment information) resulting in CRC=OK by demasking PDCCHs 1 to 8 in component band 1 with terminal ID #a, are PDCCH signals directed to terminal 200 in component band 1. In addition, PDCCH receiving section 207 determines that PDCCH 1 (downlink resource assignment information) and PDCCH 5 (uplink resource assignment information) resulting in CRC=OK by demasking PDCCHs 1 to 8 in component band 2 with terminal ID #b, are PDCCH signals directed to terminal 200 in component band 2.

On the other hand, in FIG. 4, for terminal 200, only the downlink component band in component band 1 is configured as the downlink, and the uplink component bands in component band 1 and component band 2 are configured as the uplink. Therefore, PDCCH receiving section 207 demasks PDCCHs 1 to 8 in component band 1, with terminal ID #a, and also with terminal ID #b that is configured for component band 2. Then, PDCCH receiving section 207 determines that PDCCH 1 (downlink resource assignment information) and PDCCH 5 (uplink resource assignment information) resulting in CRC=OK by demasking with terminal ID #a, is a PDCCH signal directed to terminal 200 in component band 1. In addition, PDCCH receiving section 207 determines that PDCCH 6 (uplink resource assignment information) resulting in CRC=OK by demasking with terminal ID #b, is a PDCCH signal directed to terminal 200 in component band 2.

As described above, base station 100 configures varying terminal IDs between a plurality of component bands configured for terminal 200. By this means, in base station 100, varying component bands are configured between uplink component bands, so that PDCCHs resulting from masking uplink resource assignment information about respective uplink component bands, with terminal IDs configured on a per uplink component band basis. Therefore, base station 100 can notify resource assignment information about the uplink component band associated with an unconfigured downlink component band, using PDCCHs allocated to a different component band from the component band including the associated uplink component band. In addition, terminal 200 can specify what uplink component band is indicated by resource allocation information assigned to PDCCHs, based on terminal IDs.

Therefore, even if terminal 200 performs wideband transmission only in the uplink, that is, even if the number of uplink component bands configured for terminal 200 (two, in FIG. 4) is greater than the number of downlink component bands (one, in FIG. 4), base station 100 can notify resource assignment information about a plurality of uplink component bands (respective uplink component bands in component band 1 and component band 2 in FIG. 4), using only a specific downlink component band configured (downlink component band in component band 1 in FIG. 4.) That is, terminal 200 can acquire uplink resource assignment information about the uplink component band in component band 2 without receiving PDCCHs in the downlink component band in component band 2 shown in FIG. 4. Therefore, even if wideband transmission is performed only in the uplink, terminal 200 can receive signals in a narrow reception bandwidth (received signals in a communication bandwidth of 20 MHz (component band 1) in FIG. 4), and therefore reduce its power consumption.

As described above, according to the present embodiment, a base station configures varying terminal IDs between component bands configured for each terminal. By this means, a terminal can know that resource assignment information obtained by blind-decoding with a terminal ID is the resource assignment information about the component band for which that terminal ID is configured. Therefore, even if wideband transmission is performed only in the uplink, that is, even if narrowband transmission is performed in the downlink, a terminal can specify uplink resource assignment information about a plurality of component bands, which is contained in narrowband signals, based on terminal IDs. Consequently, according to the present embodiment, even if wideband transmission is performed only in the uplink, it is possible to reduce power consumption of terminals.

Moreover, with the present embodiment, even if resources are assigned to a different component band from the component band that is targeted for resource assignment and indicated by resource assignment information, a terminal can specify which uplink component band is indicated by that resource allocation information, based on terminal IDs. Therefore, with the present embodiment, like an LTE system, a piece of resource assignment information contains only resource assignment in one component band (for example, RB assignment of a communication band of 20 MHz), so that it is possible to use the same format as in an LTE system. Consequently, according to the present embodiment, a base station does not add new information to resource assignment information assigned to PDCCHs, and base stations mask CRC bits of downlink resource assignment information, so that it is possible to perform the same processing as in an LTE system and simplify processing in a base station and terminals.

Embodiment 2

With the present embodiment, a base station configures, for each terminal, component bands to which PDCCHs to assign resource assignment information directed to each terminal to, are allocated.

Like in Embodiment 1, configuration section 101 (FIG. 1) in base station 100 according to the present embodiment configures uplink component bands and downlink component bands for each terminal, and configures component bands (hereinafter "PDCCH transmission component bands") to which PDCCHs to assign resource assignment information directed to each terminal to, are allocated.

Control section 102 assigns resource assignment information directed to each terminal, to PDCCHs allocated to PDCCH transmission component bands configured by configuration section 101.

Meanwhile, like in Embodiment 1, configuration information receiving section 206 (FIG. 2) in terminal 200 according to the present embodiment obtains information about uplink component bands and downlink component bands configured for terminal 200, and obtains information indicating PDCCH transmission component bands for terminal 200.

PDCCH receiving section 207 performs blind-decoding on only PDCCHs which are obtained in configuration information receiving section 206 and allocated to PDCCH transmission component bands for terminal 200.

Figure 6:
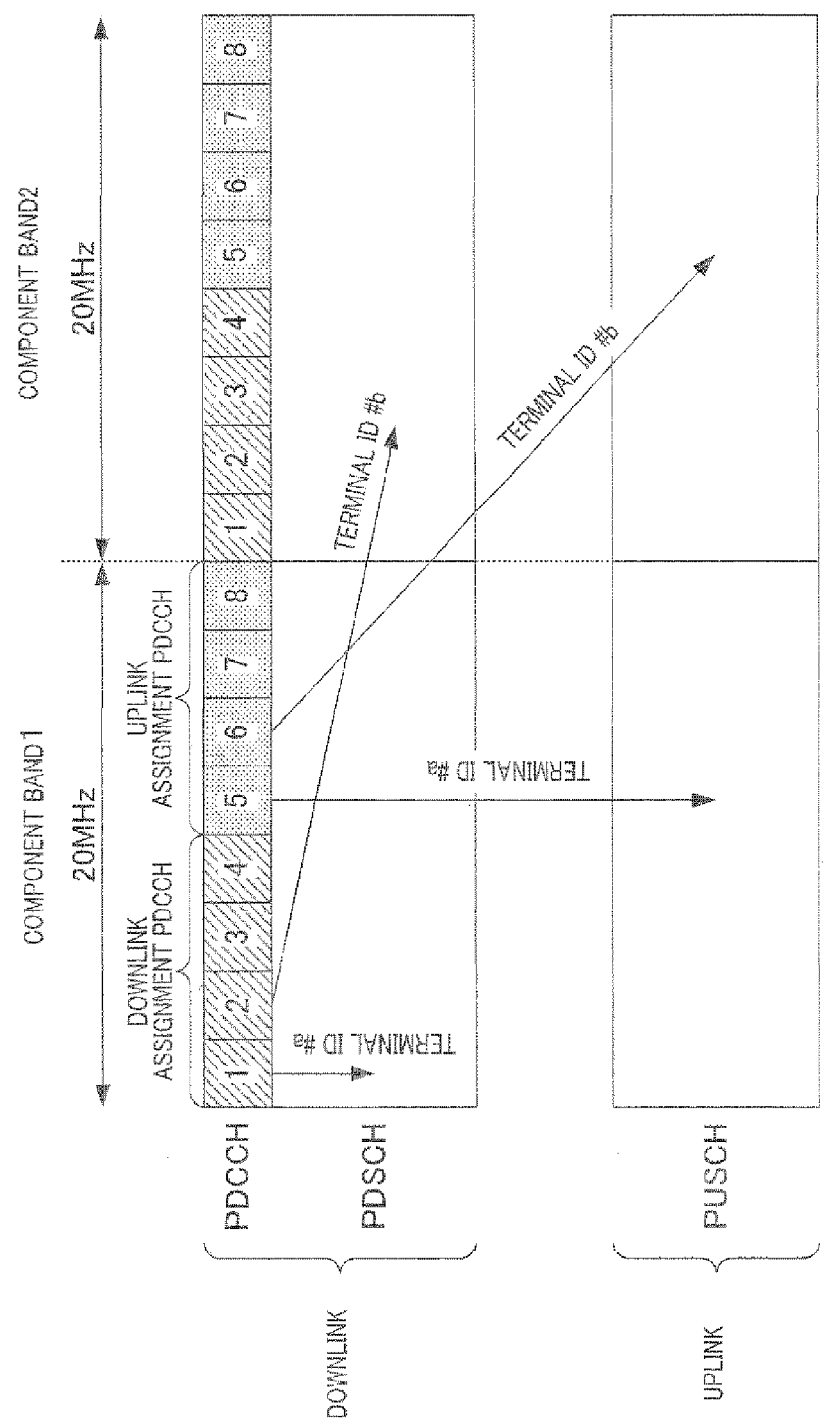
FIG. 6 shows configuration of terminal IDs according to Embodiment 2 of the present invention.
Figure 7:
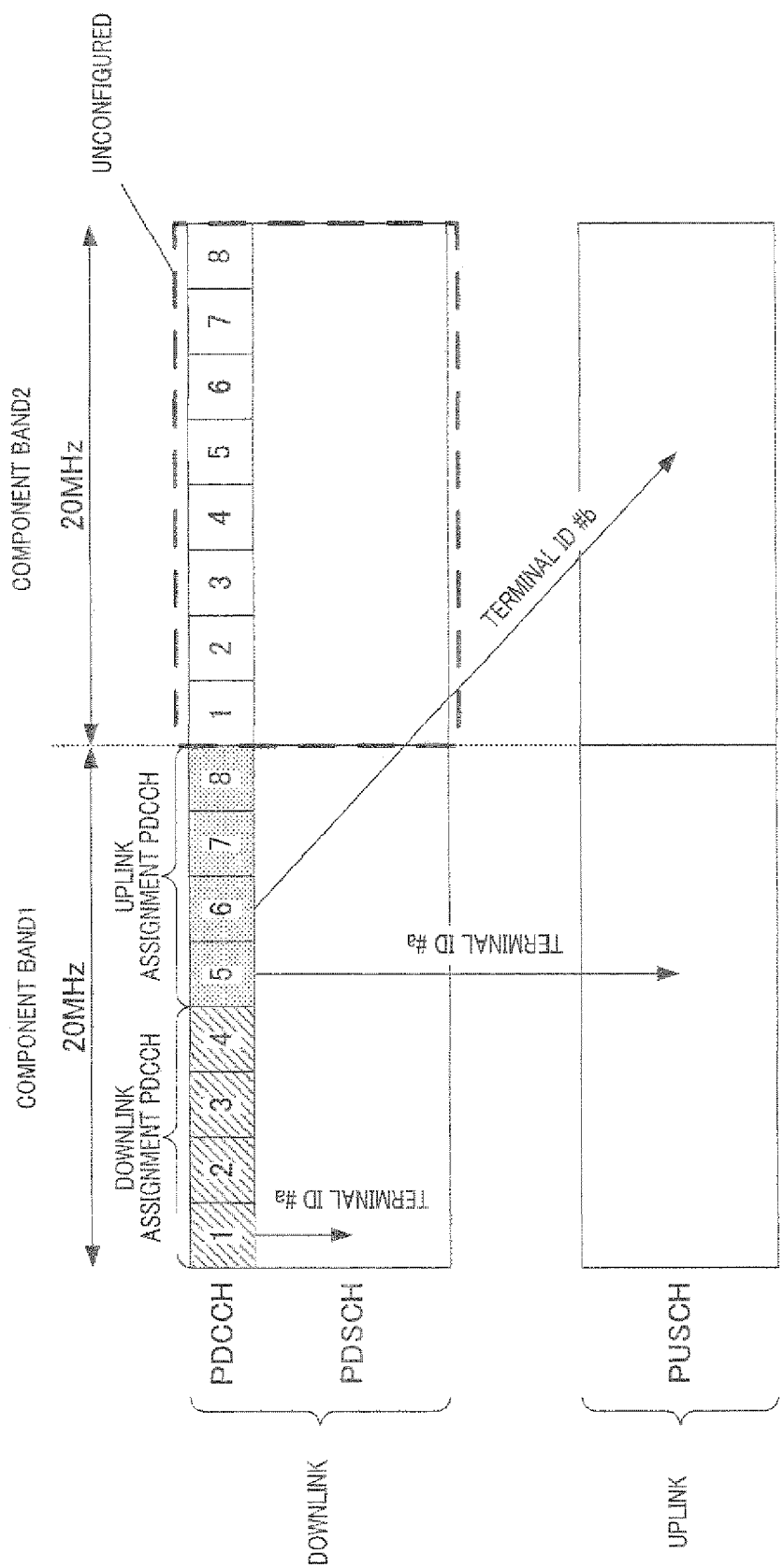
FIG. 7 shows configuration of terminal IDs according to Embodiment 2 of the present invention.

Next, operations of base station 100 and terminal 200 will be explained in detail. Like in Embodiment 1 (FIG. 3), a case in which wideband transmission is performed in both the uplink and the downlink, is shown in FIG. 6, and, like in Embodiment 1 (FIG. 4), a ease in which wideband transmission is performed only in the uplink band (that is, a downlink component band in component band 2 is unconfigured), is shown in FIG. 7. In addition, in FIG. 6 and FIG. 7, like in Embodiment 1, configuration section 101 configures terminal ID #a and terminal ID #b for component band 1 and component band 2 configured for terminal 200, respectively.

For example, in FIG. 6 and FIG. 7, configuration section 101 configures component band 1, as a component band to which PDCCHs to assign resource assignment information directed to terminal 200 to, are allocated, that is, as a PDCCH transmission component band for terminal 200.

Then, control section 102 assigns resource assignment information directed to terminal 200 in component band 1 and component band 2, to PDCCHs in component band 1, which is a PDCCH transmission component band. To be more specific, with respect to PDCCHs 1 to 8 in component band 1, control section 102 assigns downlink resource assignment information about component band 1 to PDCCH 1, downlink resource assignment information about component band 2 to PDCCH 2, assigns uplink resource assignment information about component band 1 to PDCCH 5, and assigns uplink resource assignment information about component band 2 to PDCCH 6. In this way, control section 102 assigns both resource assignment information in component band 1 and component band 2 configured for terminal 200, to PDCCHs in component band 1. Here, as shown in FIG. 6 and FIG. 7, like in Embodiment 1, control section 102 masks CRC bits added to resource assignment information about component band 1, with terminal ID #a, and masks CRC bits added to resource assignment information about component 2, with terminal ID #b.

By contrast with this, PDCCH receiving section 207 in terminal 200 performs blind-decoding on PDCCH transmission component bands for terminal 200, which are notified from base station 100, that is, PDCCHs 1 to 8 in component band 1 shown in FIG. 6 and FIG. 7. As a result of this, PDCCH receiving section 207 determines that PDCCHs resulting in CRC=OK by demasking PDCCHs 1 to 8 in component band 1 shown in FIG. 6 and FIG. 7 with terminal ID #a, are PDCCH signals directed to terminal 200 in component band 1, and determines PDCCHs resulting in CRC=OK by demasking PDCCHs 1 to 8 in component band 1 by terminal ID #b, are PDCCH signals directed to terminal 200 in component band 2.

Next, FIG. 3 in Embodiment 1 and FIG. 6 in the present embodiment will be compared. In FIG. 3, sixteen PDCCHs in both component band 1 and component band 2 are targeted for blind-decoding, so that terminal 200 performs demodulation, decoding and blind-decoding processing on these sixteen PDCCHs. By contrast with this, in FIG. 6, only eight PDCCHs in component band 1 are targeted for blind-decoding, so that terminal 200 performs demodulation, decoding and blind-decoding processing on these eight PDCCHs, that is, PDCCHs half of these in Embodiment 1.

As described above, resource assignment information directed to terminal 200 is assigned to only component band 1 shown in FIG. 6 and FIG. 7, so that terminal 200 may target only PDCCHs in component band 1 for blind-decoding. That is, terminal 200 can reduce the number of times of blind-decoding to acquire resource allocation information directed to terminal 200. In addition, as shown in FIG. 7, when wideband transmission is performed only in the uplink, base station 100 can notify resource assignment about two uplink component bands, to terminal 200, using one downlink component band, like in Embodiment 1.

As described above, according to the present embodiment, it is possible to produce the same effect as in Embodiment 1, and in addition, when wideband transmission is performed in both the uplink and the downlink, it is possible to reduce the number of times of blind-decoding in a terminal. Therefore, according to the present embodiment, the number of times of blind-decoding is reduced, so that it is possible to realize simple terminals. In addition, a terminal needs only to store PDCCHs (PDCCHs in component band 1 in FIG. 6 and FIG. 7) to which resource assignment information directed to the terminal are assigned, in a memory, and therefore can save its memory capacity.

In addition, according to the present embodiment, a base station configures, for each terminal, component bands to which PDCCHs to assign resource assignment information directed to each terminal to, are allocated (that is, PDCCH transmission component bands.) Moreover, a base station configures component bands with high communication quality as PDCCH transmission component bands, and therefore can reduce a total of radio resources (e.g. time frequency resources) for PDCCH transmission. For example, when two component bands belong to two different frequency bands (2 GHz band and 3.4 GHz band), a base station needs to transmit PDCCHs only in component bands belonging to a lower frequency band, that is, a band of 2 GHz exhibiting smaller propagation loss. By this means, a base station can transmit PDCCHs at a higher coding rate, so that it is possible to reduce radio resources used for PDCCHs.

Embodiment 3

With the present embodiment, only when wideband transmission is performed only in the uplink, a base station configures varying terminal IDs between uplink component bands configured for each terminal.

In general (for example, in a case in which the uplink and the downlink are symmetric, or in a case in which wideband transmission is performed only in the downlink), configuration section 101 (FIG. 1) in base station 100 in the present embodiment configures one predetermined ID per terminal. On the other hand, in a case in which wideband transmission is performed only in the uplink (that is, in a case in which the number of component bands configured is greater than the number of downlink component bands), a configuration section 101 further configures an additional terminal ID (temporary terminal ID) for a terminal. Here, configuration section 101 generates the number of temporary terminal IDs equivalent to the difference between the number of uplink component bands and the number of downlink component bands. Configuration section 101 configures the same number of terminal IDs (a predetermined terminal ID and a temporary terminal ID) as the number of uplink component bands by adding a temporary terminal ID. By this means, when wideband transmission is performed only in uplink component bands, configuration section 101 configures varying terminal IDs between uplink component bands, like in Embodiment 1. Configuration section 101 outputs configuration information containing the configured temporary terminal ID, to PDCCH generating section 103 and modulation section 105. In addition, when wideband transmission only in the uplink is not performed again after adding a terminal ID, configuration section 101 releases a temporary terminal ID.

Here, configuration section 101 generates a temporary terminal ID according to a predetermined terminal ID. For example, configuration section 101 may select any different terminal ID from a predetermined ID as a temporary terminal ID, or may generate a temporary terminal ID based on a predetermined ID, according to predetermined configuration rules.

PDCCH generating section 103 masks CRC bits added to resource assignment information with terminal IDs contained in configuration information inputted from configuration section 101. To be more specific, when a temporary terminal ID is not configured, PDCCH generating section 103 masks CRC bits using one predetermined terminal ID, in all component bands configured for a terminal. On the other hand, when a temporary terminal ID is configured, PDCCH generating section 103 masks CRC bits, using terminal IDs (a predetermined terminal ID and a temporary terminal ID) configured on a per uplink component band basis.

By contrast with this, PDCCH receiving section 207 in terminal 200 usually performs blind-decoding, using one predetermined terminal ID contained in configuration information. That is, PDCCH receiving section 207 demasks PDCCHs allocated to a downlink component band configured for terminal 200, with a predetermined terminal ID. Meanwhile, when wideband transmission is performed only in the uplink, PDCCH receiving section 207 performs blind-decoding, using a predetermined terminal ID and a temporary terminal ID contained in configuration information.

Next, operations of base station 100 and terminal 200 will be explained in detail. Like in Embodiment 1 (FIG. 3), a case in which wideband transmission is performed in both the uplink and downlink, is shown in FIG. 8, and, like in Embodiment 1 (FIG. 4), a case in which wideband transmission is performed only in the uplink (that is, in a case in which the downlink component band in component band 2 is unconfigured), is shown in FIG. 9.

Figure 8:
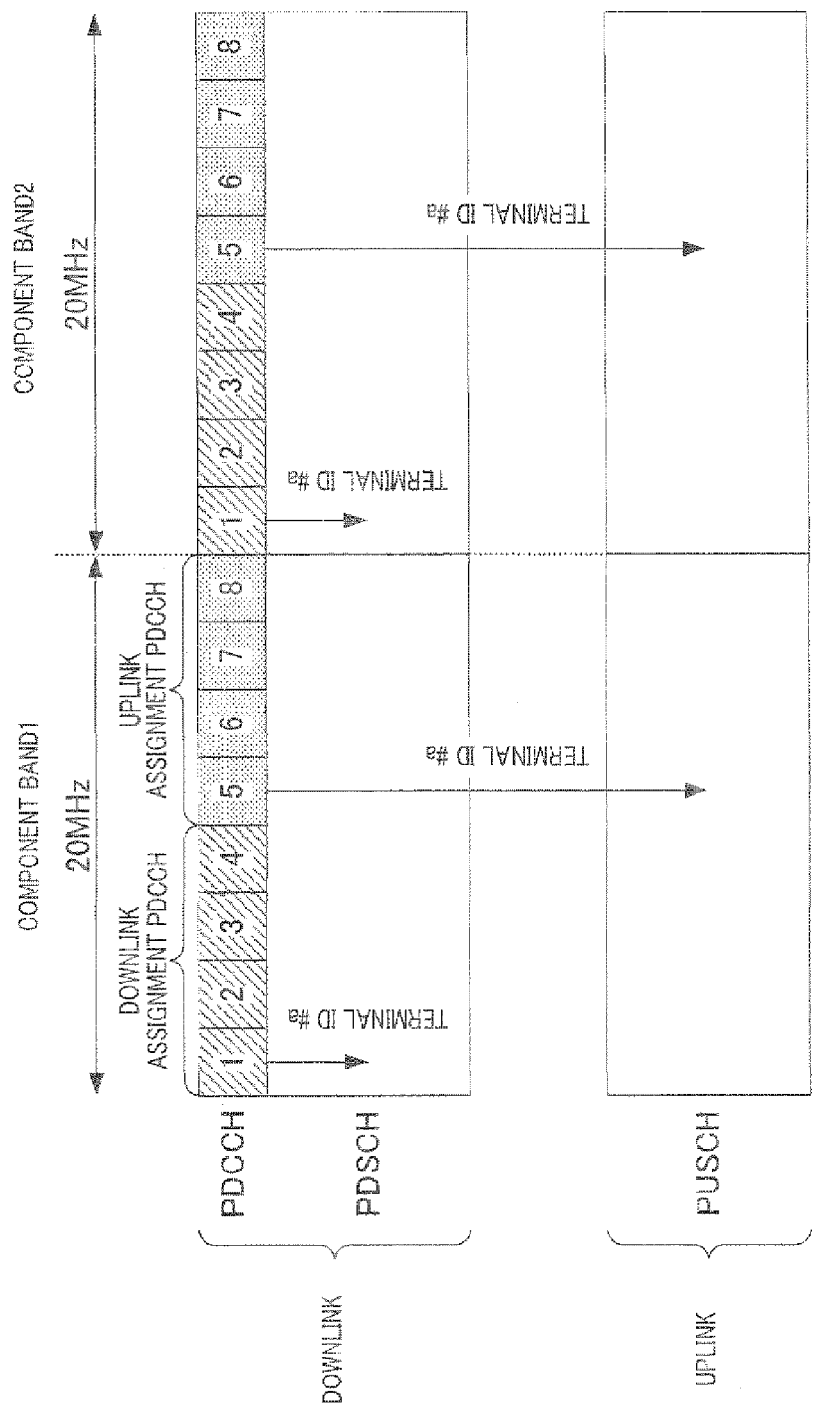
FIG. 8 shows configuration of terminal IDs according to Embodiment 3 of the present invention.
Figure 9:
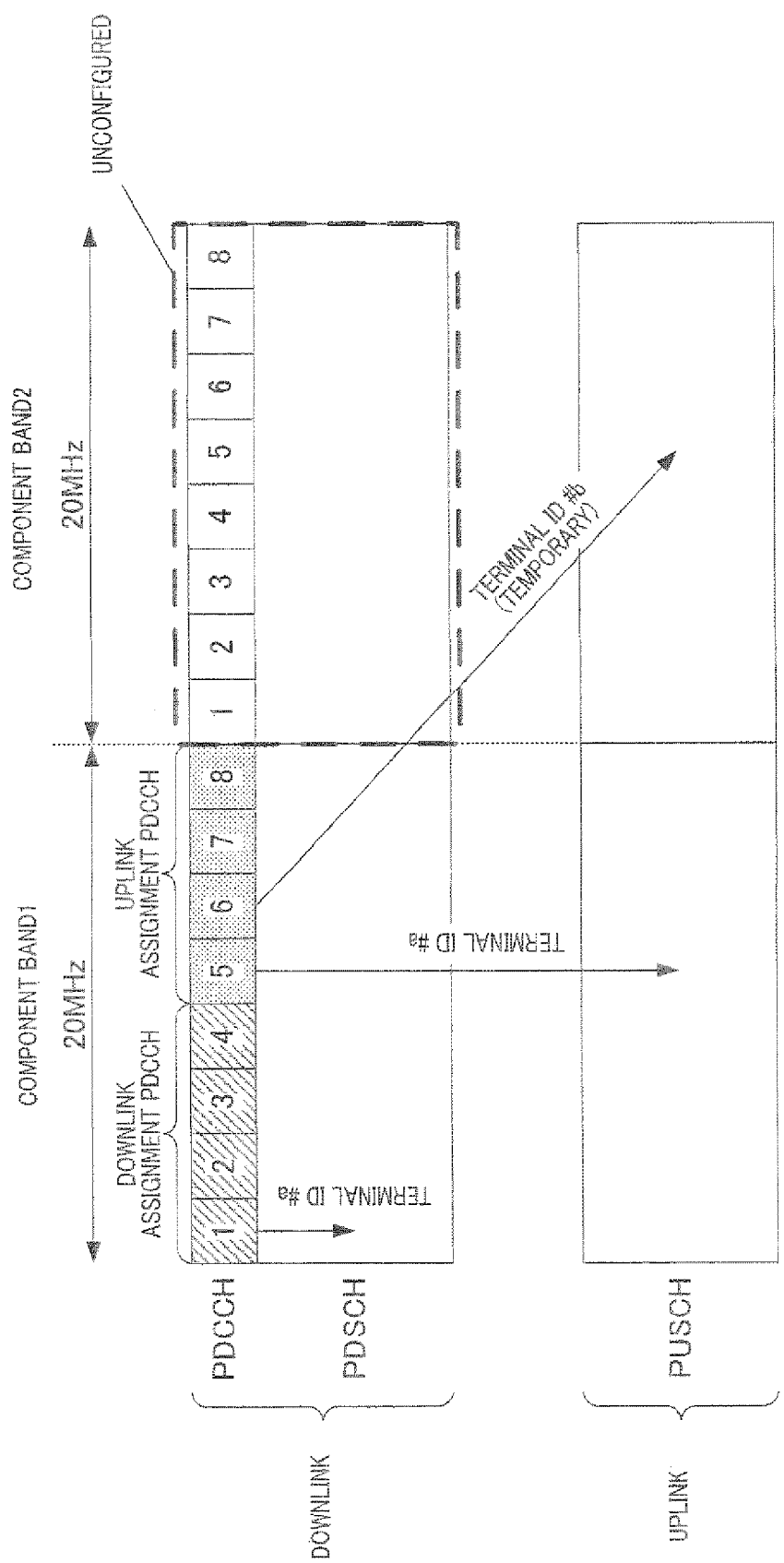
FIG. 9 shows configuration of terminal IDs according to Embodiment 3 of the present invention.

As shown in FIG. 8, configuration section 101 configures terminal ID #a for terminal 200, as a predetermined terminal ID.

Then, as shown in FIG. 8, PDCCH generating section 103 masks, with terminal ID #a, CRC bits of all resource allocation information assigned to PDCCHs in component band 1 and component band 2 (PDCCH 1 and PDCCH 5 in component band 1 and PDCCH 1 and PDCCH 5 in component band 2.)

Therefore, PDCCH receiving section 207 in terminal 200 demasks PDCCHs 1 to 8 allocated to component band 1 and component band 2 shown in FIG. 8, with terminal ID #a. To be more specific, PDCCH receiving section 207 demasks sixteen PDCCHs composed of PDCCHs 1 to 8 allocated to component band 1 and component 2 shown in FIG. 8, respectively, with terminal ID #a, and determines that PDCCHs resulting in CRC=OK are PDCCH signals directed to terminal 200.

Meanwhile, when wideband transmission is performed only in the uplink as shown in FIG. 9, configuration section 101 adds terminal ID #a to terminal 200, and additionally configures terminal ID #b for terminal 200, as a temporary terminal ID. To be more specific, configuration section 101 configures terminal ID #a for component band 1 configured in terminal 200, and reconfigures temporary terminal ID #b for component band 2.

Assignment section 102 assigns resource assignment information about component band 1 to PDCCH 1 and PDCCH 5 in component band 1, and assigns uplink resource assignment information about component band 2 to PDCCH 6 in component band 1.

Then, as shown in FIG. 9, PDCCH generating section 103 masks CRC bits of resource assignment information about component band 1 assigned to PDCCH 1 and PDCCH 5 in component band 1, with terminal ID #a. In addition, as shown in FIG. 9, PDCCH generating section 103 masks CRC bits of uplink resource assignment information about the downlink component band in component band 2, which is assigned to PDCCH 6 in component band 1, with temporary terminal ID #6.

By contrast with this, like Embodiment 1, PDCCH receiving section 207 in terminal 200 demasks PDCCHs 1 to 8 in component band 1 shown in FIG. 9, with terminal ID #b, and determines that PDCCHs resulting in CRC=OK are PDCCH signals directed to terminal 200 in component band 1, and demasks PDCCHs 1 to 8 in component band 1, with terminal ID #b, and determines that PDCCHs resulting in CRC=OK are PDCCH signals directed to terminal 200 in component band 2.

Figure 10:
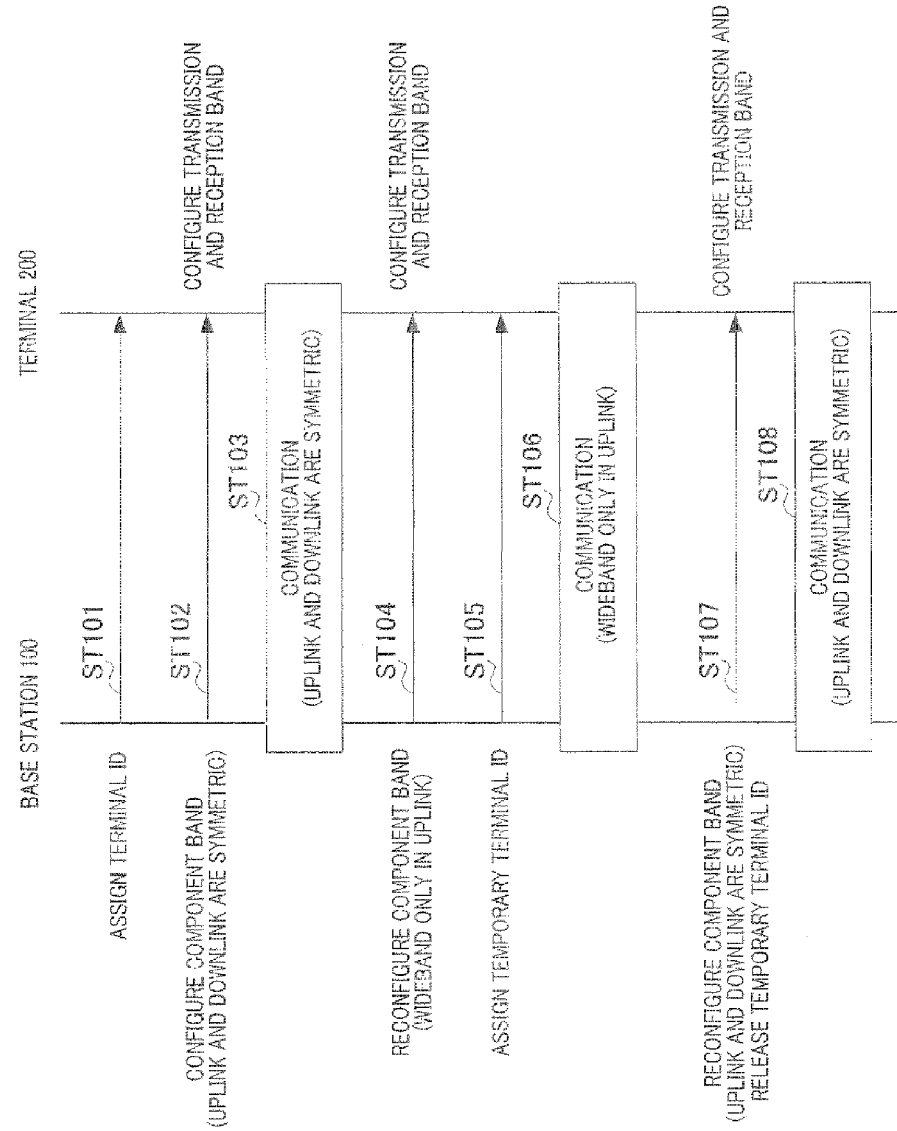
FIG. 10 is a sequence diagram showing processing to configure terminal IDs according to Embodiment 3 of the present invention.

Next, a sequence diagram showing processing to configure component bands and terminal IDs is shown in FIG. 10.

In step (hereinafter "ST") 101, configuration section 101 in base station 100 configures a terminal ID (for example, terminal ID #a in FIG. 8) for terminal 200, and notifies to the configured terminal ID to terminal 200. In ST 102, configuration section 101 configures uplink component bands and downlink component bands (for example, as shown in FIG. 8, two uplink component bands and two downlink component bands) for terminal 200 such that the uplink and the downlink are symmetric, and notifies the configured component bands to terminal 200. Configuration information receiving section 206 in terminal 200 configures a reception bandwidth (two downlink component bands) and a transmission bandwidth (two uplink component bands.) In ST 103, communication (communication targeting the uplink and the downlink) is performed between base station 100 and terminal 200. At this time, as shown in FIG. 8, in base station 100 and terminal 200, uplink and downlink resource assignment in component band 1 and component band 2 are performed using PDCCHs masked with terminal ID #a.

In ST 104, configuration section 101 in base station 100 reconfigures component bands configured for terminal 200 to perform wideband transmission only in the uplink, based on the required data transmission rate or the amount of transmission data in the uplink and the downlink, and notifies the reconfigured component bands to terminal 200. For example, configuration section 101 configures two uplink component bands and one downlink component band for terminal 200, as shown in FIG. 9. Configuration information receiving section 206 configures a reception bandwidth (one downlink component band) and a transmission bandwidth (two uplink component bands), like in ST 102.

In ST 105, configuration section 101 configures a temporary terminal ID (for example, terminal ID #b in FIG. 9), and notifies the configured terminal ID to terminal 200. In ST 106, communication (wideband communication only in the uplink) is performed between base station 100 and terminal 200. At this time, as shown in FIG. 9, in base station 100 and terminal 200, uplink resource assignment and downlink resource assignment in component band 1 are performed, using PDCCHs in component band 1 masked with terminal ID #a, and uplink resource assignment in component band 2 is performed, using PDCCHs in component band 1 masked with terminal ID #b.

In ST 107, configuration section 101 in base station 100 reconfigures component bands, for example, like in ST 102, that is, such that the uplink and the downlink are symmetric as shown in FIG. 8, based on the required data transmission rate or the amount of transmission data in the uplink and the downlink, and releases the temporary terminal ID (terminal ID #b in FIG. 9) configured in ST 105. Configuration information receiving section 206 in terminal 200 configures a reception bandwidth (two downlink component bands) and a transmission bandwidth (two uplink component bands), like in ST 102. In ST 108, communication (communication targeting the uplink and downlink) is performed between base station 100 and terminal 200.

Here, with Embodiment 1 (FIG. 3 and FIG. 4), varying terminal IDs (terminal ID #a and terminal ID #b) are configured between component bands configured for each terminal in advance. By contrast with this, with the present embodiment, only when wideband transmission is performed only in the uplink as shown in FIG. 9, varying terminal IDs (terminal ID #a and temporary terminal ID #b) are configured between component bands configured for each terminal. That is, as shown in FIG. 8, when the uplink and the downlink are symmetric as shown in FIG. 8 (or when wideband transmission is performed only in the downlink), only terminal ID #a is configured for terminal 200, so that terminal 100 can configure, for example, terminal ID #b for another terminal.

As described above, according to the present embodiment, only when wideband transmission is performed only in the uplink, a base station configures temporary terminal IDs. That is, only when wideband transmission is performed only in the uplink, a base station configures varying terminal IDs between component bands (uplink component bands) for each terminal. Therefore, with the present embodiment, a base station can minimize terminal IDs used per terminal by additionally configuring a terminal ID (temporary terminal ID) per terminal, so that it is possible to assign enough terminal IDs to more terminals in a system.

Embodiment 4

With the present embodiment, only when wideband transmission is performed only in the uplink, a base station additionally configures a temporary terminal ID for each terminal, like in Embodiment 3.

With the present embodiment, a base station creates a temporary terminal ID, according to a predetermined terminal ID configured for each terminal.

To be more specific, configuration section 101 (FIG. 1) in base station 100 according to the present embodiment configures one predetermined terminal ID for a terminal, like in Embodiment 3. In addition, when wideband transmission is performed only in the uplink, configuration section 101 configures a temporary terminal ID created according to a predetermined terminal ID. For example, configuration section 101 creates a temporary terminal ID by cyclically shifting (i.e. bit shifting) a predetermined terminal ID.

For example, by regarding a downlink component band to which PDCCHs to assign resource assignment information to, is allocated, as a reference downlink component band, a relative index indicating how far the downlink component band associated with an uplink component band targeted for resource assignment indicated by uplink resource assignment information, is apart from the reference downlink component band, is the number of cyclic shifts. For example, the downlink component band (e.g. component band 1) neighboring a reference downlink component band (e.g. component band 1) is one component band apart from the reference downlink component band, so that a relative index is 1. Likewise, for example, when the downlink component band in component band 1 is regarded as a reference downlink component band, for example, the downlink component band in component band (M+1) is M component bands apart from the reference downlink component band, so that a relative index is M.

Figure 11:
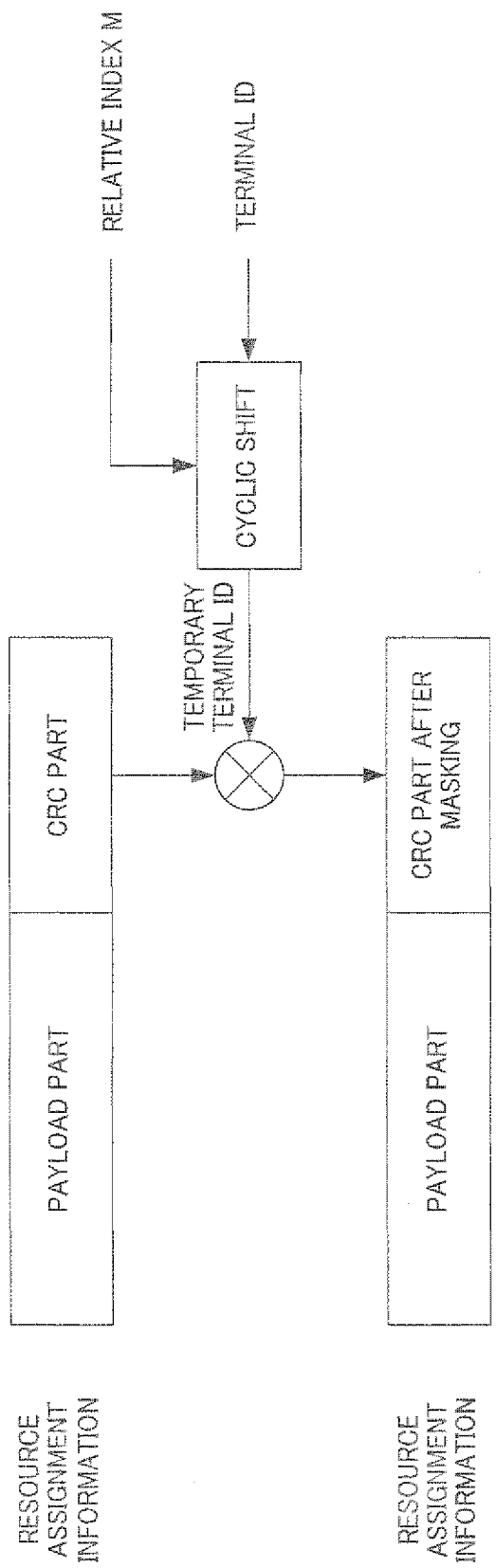
FIG. 11 shows processing to create a temporary terminal ID according to Embodiment 4 of the present invention.

Then, as shown in FIG. 11, configuration section 101 creates a temporary terminal ID by cyclically shifting a predetermined terminal ID configured in terminal 200 by a relative index (M in FIG. 11). By this means, configuration section 101 configures varying terminal IDs (a predetermined terminal ID and a temporary terminal ID) between a plurality of uplink component bands. Then, PDCCH generating section 103 masks a CRC part of resource assignment information composed of a payload part including data in itself and the CRC part including CRC bits, with a temporary terminal ID, as shown in FIG. 11.

Figure 12:
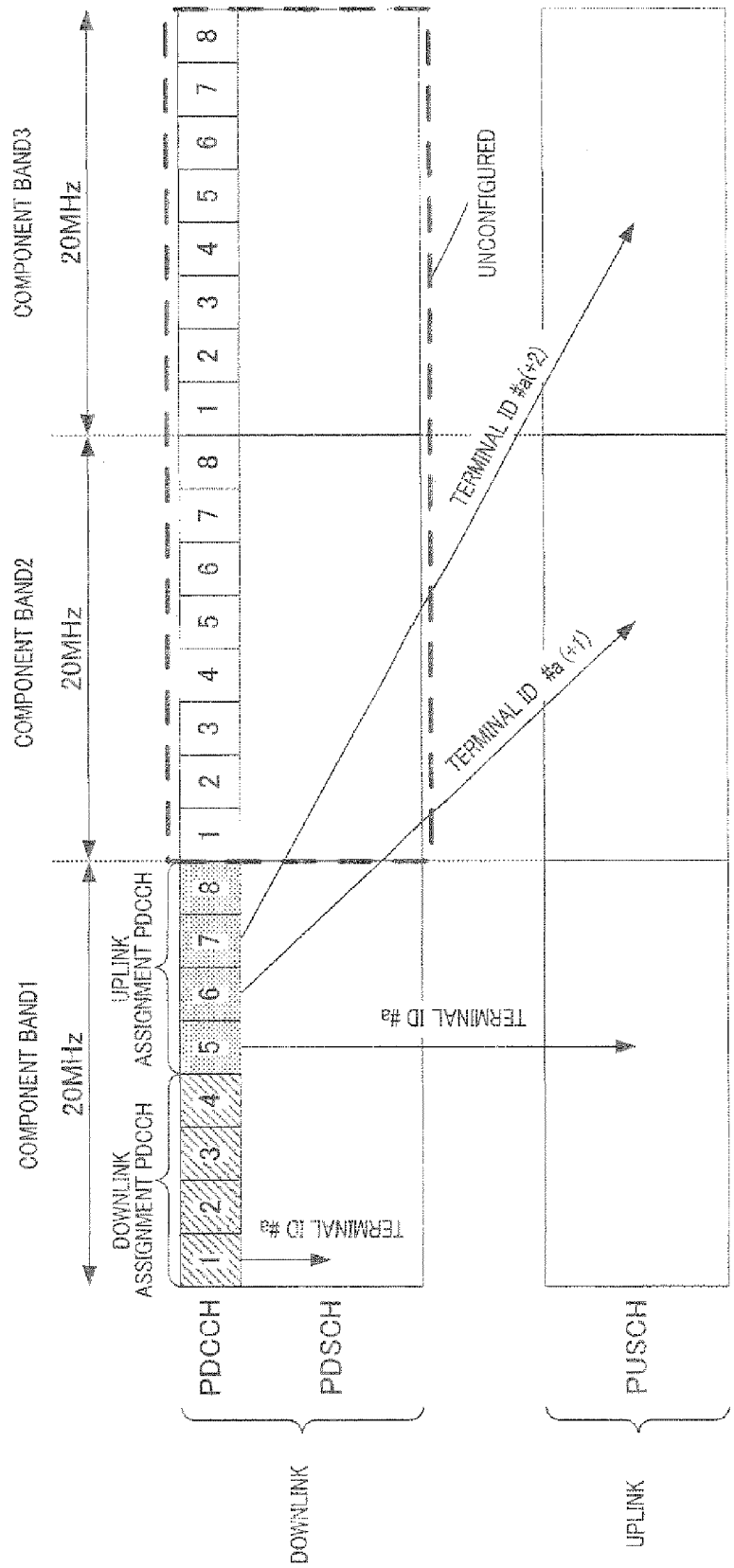
FIG. 12 shows configuration of terminal IDs according to Embodiment 4 of the present invention.

Next, for example, as shown in FIG. 12, a case will be explained where three uplink component bands (component bands 1 to 3) and one downlink component band (component band 1) are configured for terminal 200 (FIG. 2). That is, in FIG. 12, downlink component bands both in component band 1 and component band 2 are unconfigured. In addition, in FIG. 12, predetermined terminal ID #a is configured for terminal 200. In addition, in FIG. 12, base station 100 assigns downlink resource assignment information about component band 1 to PDCCH 1, and assigns uplink resource assignment information about component bands 1 to 3, to PDCCH 5, PDCCH 6 and PDCCH 7, respectively. That is, in FIG. 12, with respect to component band 1, relative indexes are calculated.

As shown in FIG. 12, base station 100 masks resource assignment information about component band 1, which is assigned to PDCCH 1 and PDCCH 5 in component band 1, with terminal ID #a configured for terminal 200. In addition, the relative index of component band 2 to component band 1 is 1, so that base station 100 masks uplink resource assignment information about component band 2, which is assigned to PDCCH 6 in component band 1, with temporary terminal ID #a (+1) obtained by cyclically shifting uplink resource assignment information about component band 2 by relative index (1), as shown in FIG. 12. Likewise, the relative index of component band 3 to component band 1 is 2, so that base station 100 masks uplink resource assignment information about component band 3, which is assigned to PDCCH 7 in component band 1, with temporary terminal ID #a (+2) obtained by cyclically shifting terminal ID #a by relative index (2), as shown in FIG. 12.

Meanwhile, when wideband transmission is performed only in the uplink, terminal 200 creates a terminal ID (temporary terminal ID) for each component band, according to a predetermined terminal ID (terminal ID #a in FIG. 12) configured for terminal 200, like base station 100. By this means, base station 100 does not need to notify a temporary terminal ID to terminal 200. In addition, configuration section 101 calculates a relative index to a reference component band and creates a terminal ID obtained by cyclically shifting a predetermined terminal ID by the relative index, so that base station 100 does not need to notify associations between component bands and terminal IDs. That is, base station 100 needs only to notify only a predetermined terminal ID to terminal 200 as a notification related to terminal IDs.

In addition, terminal 200 needs only to specify relative indexes between component bands configured for terminal 200, and does not need to know the total number of component bands in the system and absolute component band numbers, so that it is possible to reduce the amount of control information required to notify terminal IDs from base station 100 to terminal 200.

As described above, according to the present embodiment, it is possible to produce the same effect as in Embodiment 3, and moreover, it is not necessary to notify temporary terminal IDs from a base station to terminals, so that it is possible to reduce the amount of control information. Moreover, according to the present embodiment, a base station creates a terminal ID obtained by cyclically shifting a terminal ID configured for a reference component band by a relative index, so that it is possible to use any component band as a reference component band. Accordingly, a base station can notify resource assignment information about a plurality of uplink component bands, even from PDCCHs allocated to downlink component bands in any component bands.

Here, with the present embodiment, a case has been explained where a base station creates a temporary terminal ID by cyclically shifting a predetermined terminal ID by a relative index. However, according to the present invention, a base station may cyclically shift a CRC part added to resource assignment information by a relative index, and mask a CRC part (CRC bits) after cyclic shift, with a predetermined terminal ID. Alternatively, a base station may mask a CRC part with a predetermined terminal ID and cyclically shift a CRC part after masking by a relative index. In this case, it is possible to produce the same effect as in the present embodiment.

In addition, with the present embodiment, although a case has been explained where a base station creates a temporary terminal ID by cyclically shifting a predetermined terminal ID by a relative index, a base station may create a temporary terminal ID by adding a relative index to a predetermined terminal ID, according to the present invention.

Embodiment 5

With the present embodiment, a base station configures varying search spaces between component bands configured for each terminal.

Each PDCCH is transmitted per resource or every a plurality of resources, where a resource is referred to as "CCE (control channel element)". In addition, in order to reduce the number of times of blind-decoding in a terminal, LTE are studying a method for limiting CCE regions (search spaces), which are CCEs targeted for blind-decoding, on a per terminal basis. A base station assigns resource assignment information to PDCCHs in a search space assigned to a terminal, which is the destination of the resource assignment information, and the terminal performs blind-decoding on only the PDCCHs in the search space assigned to the terminal.

With the present embodiment, a base station configures varying search spaces between component bands configured for each terminal, and each terminal specifies resource assignment information per component band by performing blind-decoding on a search space per component band.

Figure 13:
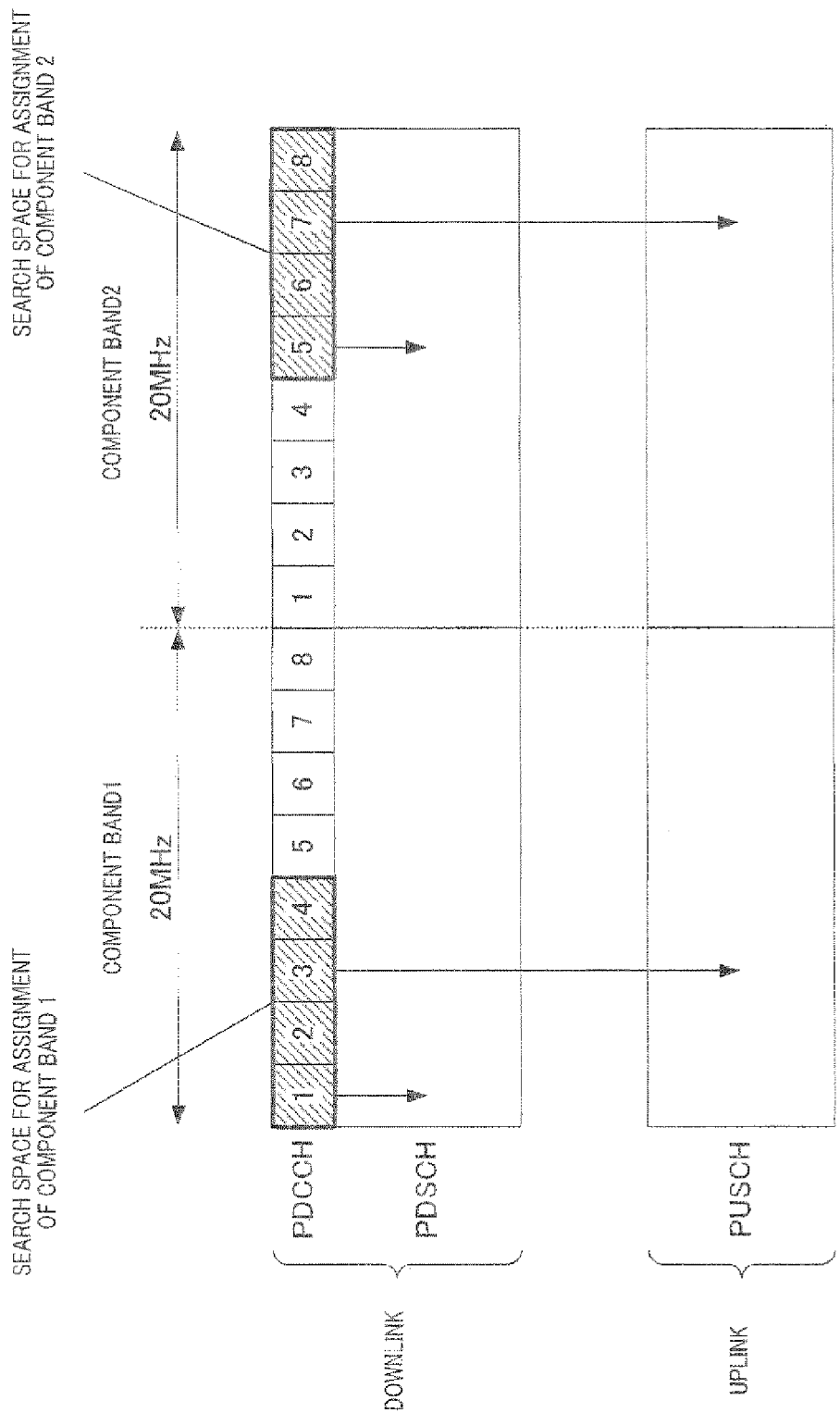
FIG. 13 shows configuration of search spaces according to Embodiment 5 of the present invention.

Configuration section 101 (FIG. 1) in base station 100 according to the present embodiment configures varying search spaces between a plurality of component bands configured for each terminal. For example, as shown in FIG. 13, when wideband transmission is performed in both the uplink and the downlink, configuration section 101 configures PDCCHs 1 to 4 for downlink component bands in component band 1, as a search space in component band 1 (search space for assignment of component band 1.) In addition, configuration section 101 configures PDCCHs 5 to 8 for downlink component bands in component band 2, as a search space in component band 2 (search space for assignment of component band 2.)

Figure 14:
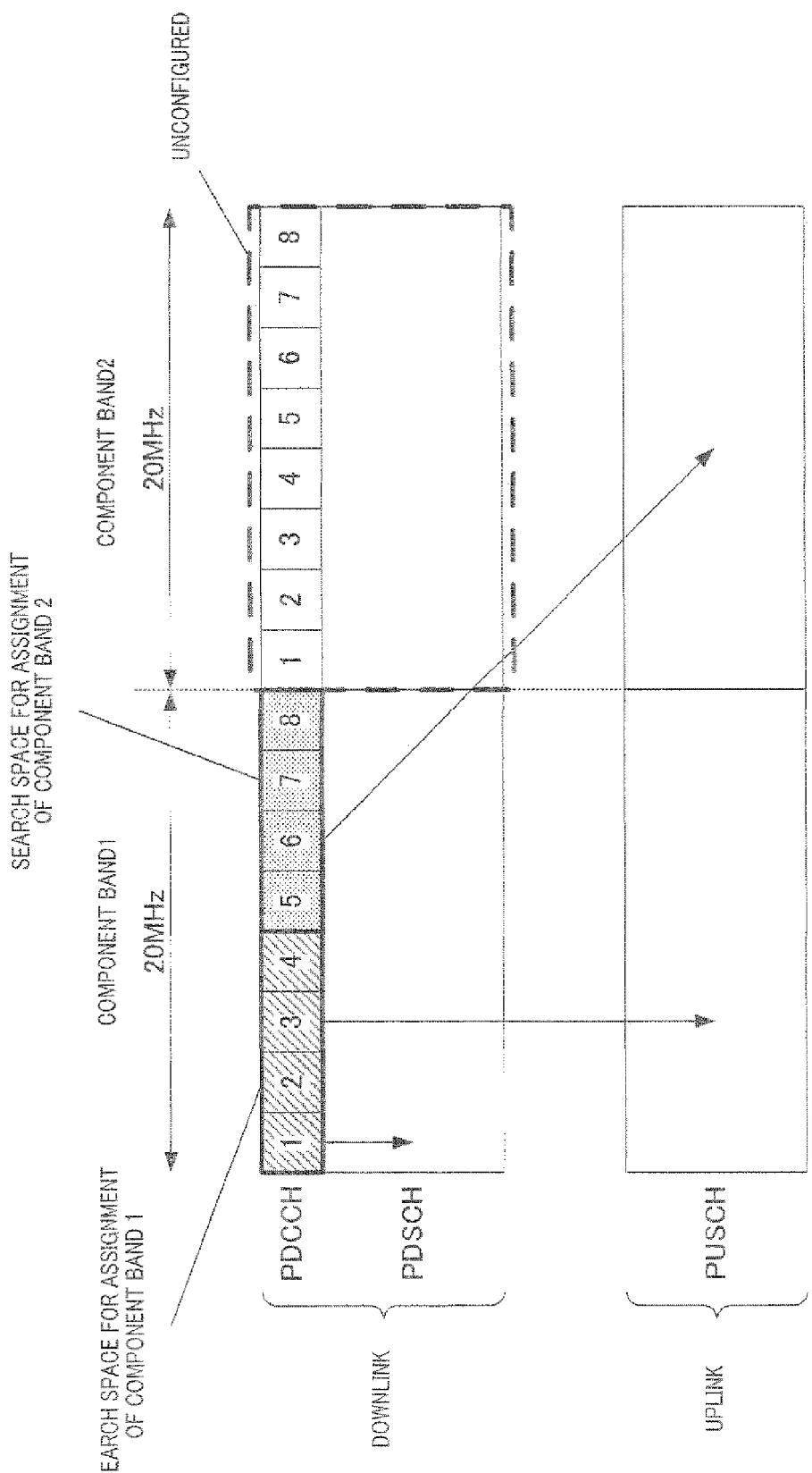
FIG. 14 shows configuration of search spaces according to Embodiment 5 of the present invention.

On the other hand, for example, as shown in FIG. 14, when wideband transmission is performed only in the uplink (that is, when component band 2 is unconfigured), configuration section 101 configures PDCCHs 1 to 4 in the downlink component band in component band 1 as a search space for assignment of component band 1, and configures PDCCHs 5 to 8 in the downlink component band in component band 1 as a search space for assignment of component band 2.

Control section 102 assigns uplink resource assignment information and downlink resource assignment information to PDCCHs in a search space configured for each terminal, based on information related to search spaces indicated by configuration information inputted from configuration section 101. For example, in FIG. 13 and FIG. 14, control section 102 assigns resource assignment information about component band 1 to any of PDCCHs 1 to 4 (in component band 1) in the search space for assignment of component 1 shown in FIG. 13 and FIG. 14. In addition, control section 102 assigns resource assignment information about component band 2 to PDCCHs 5 to 8 (in component band 2) in the search space for assignment of component band 2 shown in FIG. 13 and FIG. 14.

Here, configuration section 101 configures one terminal ID for each terminal. Therefore, PDCCH generating section 103 masks CRC bits added to resource assignment information directed to each terminal, with the terminal ID configured for each terminal, independent of component bands.

PDCCH receiving section 207 (FIG. 2) in terminal 200 performs blind-decoding on only PDCCHs in search spaces configured for terminal 200. To be more specific, PDCCH receiving section 207 obtains resource assignment information in component band 1 directed to terminal 200 by performing blind-decoding on only PDCCHs 1 to 4 in the search space for assignment of component band 1 shown in FIG. 13 and FIG. 14. Likewise, PDCCH receiving section 207 obtains resource assignment information in component band 2 directed to terminal 200 by performing blind-decoding on only PDCCHs 5 to 8 (in component band 2) in the search space for assignment of component band 2 shown in FIG. 13, or PDCCHs 5 to 8 (in component band 1) in the search space for assignment of component band 2 shown in FIG. 14.

As described above, according to the present embodiment, a base station configures varying search spaces between component bands configured for each terminal. By this means, even if wideband transmission is performed only in the uplink, a base station can assign uplink resource assignment information about different component bands, to different search spaces in one downlink component band. Therefore, each terminal can specify resource assignment information for each component band by performing blind-decoding on only a search space per component band. Consequently, according to the present embodiment, it is possible to produce the same effect as in Embodiment 1.

That is, when wideband transmission is performed only in the uplink, in other wards, when narrowband transmission is performed in the downlink, each terminal can specify uplink resource assignment information about a plurality of component bands, which is contained in narrow band signals, based on search spaces. Therefore, according to the present embodiment, even if wideband transmission is performed only in the uplink, it is possible to reduce power consumption of terminals. Moreover, with the present embodiment, even if resources are assigned to a different component band from a component band targeted for resource assignment indicated by resource assignment information, terminals can specify what uplink component band is indicated by that resource assignment information, based on search spaces. Therefore, with the present embodiment, like an LTE system, one piece of resource assignment information contains only resource assignment (for example, RB assignment in a communication band of 20 MHz) in one component band, so that it is possible to use the same format as in an LTE system. Consequently, according to the present embodiment, a base station does not add new information to resource assignment information assigned to PDCCHs, and terminals specify search spaces to transmit PDCCHs, so that it is possible to perform the same processing as in an LTE system and simplify processing in a base station and terminals.

Here, with the present embodiment, a case has been explained where a base station configures varying search spaces according to component bands targeted for assignment, for PDCCHs used for assignment of uplink component bands. However, according to the present invention, when a plurality of downlink component bands are configured, a base station may similarly configure varying search spaces according to component bands targeted for assignment, for PDCCHs used for assignment of downlink component bands. In this case, it is possible to share processing between the uplink and the downlink to allow simplification of terminals.

Each embodiment of the present invention has been explained.

Figure 15:
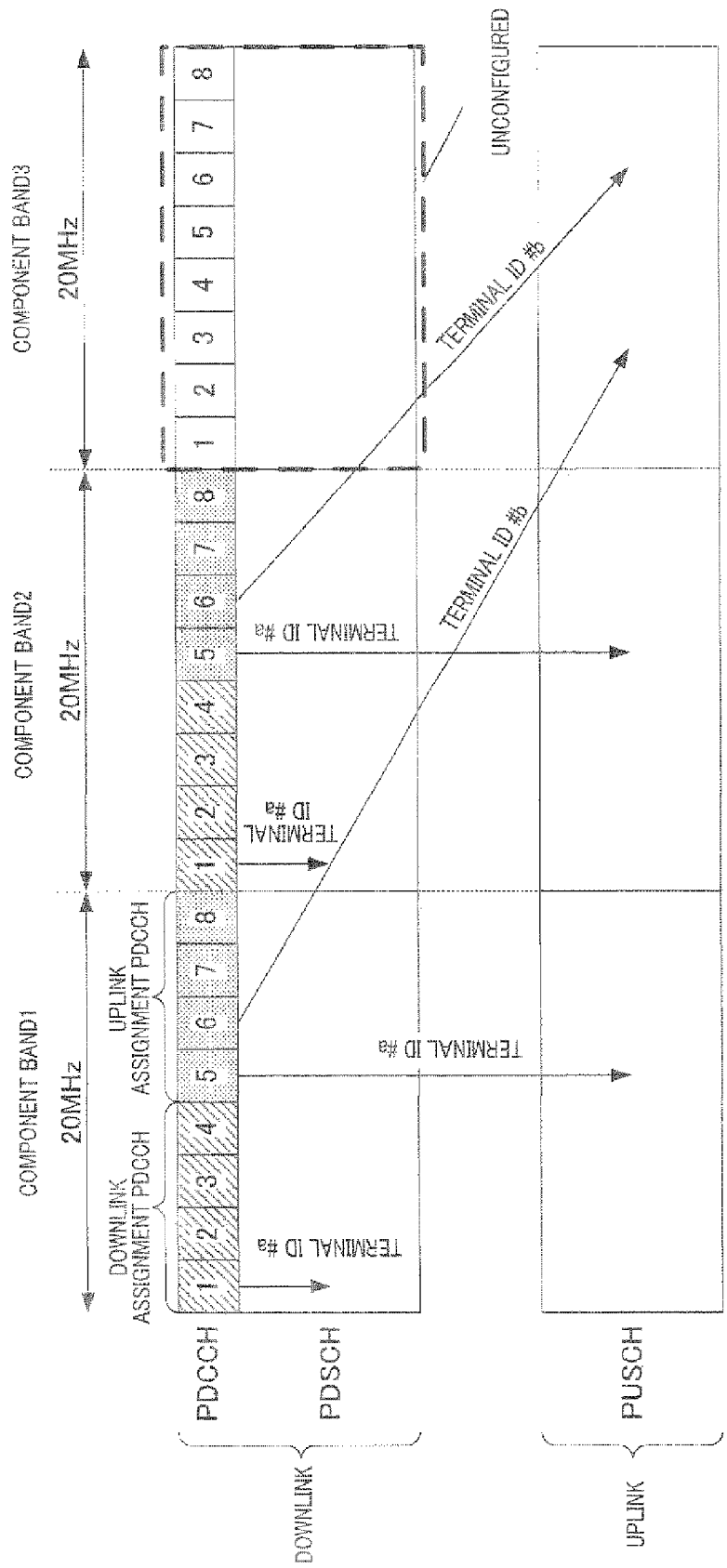
FIG. 15 shows another configuration of terminal IDs according to the present invention.

Here, in the present invention, for example, as shown in FIG. 15, when three uplink component bands and two downlink component bands are configured, that is, when a smaller number of downlink component bands than the number of uplink component bands are configured, there are a plurality of component bands to assign resource assignment information to. To be more specific, in FIG. 15, PDCCHs in the downlink component bands in both component band 1 and component band 2 are used to notify resource assignment information. Here, with the above-described embodiments, a case has been explained where the component band (downlink component band in component band 2 in FIG. 15) closest to the unconfigured downlink component band (downlink component band in component band 3 in FIG. 15) is used to notify resource assignment information about the uplink component band associated with the unconfigured component band. However, according to the present invention, component bands used to notify resource assignment information about the uplink component band associated with an unconfigured downlink component band may be assigned evenly to usable component bands (component band 1 and component band 2 in FIG. 15.) By this means, it is possible to prevent resource assignment information from being assigned to only a specific component band. Alternatively, it may be determined in advance what component band is used to notify resource assignment information. For example, component bands may be determined according to low-order bits of the terminal ID configured for each terminal. By this means, component bands to assign resource assignment information to, are distributed, so that it is possible to prevent resource assignment information from being assigned to only a specific component band.

In addition, in the present invention, C-RNTIs (cell-radio network temporary identifiers) may be used as terminal IDs.

Moreover, with the above-described embodiments, a case has been described where a base station masks (scrambles) CRC bits added to control information, with terminal IDs. However, according to the present invention, CRC bits may be masked (scrambled) with, not exclusively terminal IDs, varying sequences between component bands, or sequences obtained by multiplying terminal IDs by sequences varying between component bands, respectively. Here, it is possible to perform the same PDCCH generation processing (or PDCCH reception processing) as in an LTE system by using terminal IDs for masking (scrambling) CRC bits. Here, when sequences other than terminal IDs are used for masking (scrambling) CRC bits, additional masking (scrambling) processing is required, but the amount of additional processing is not large enough to influence the system, so that it is possible to construct simple base station and terminals, like the above-described embodiments.

In addition, with the above-described embodiments, although a case has been described where a base station applies masking (scrambling) processing to CRC bits (for example, the CRC part shown in FIG. 11), a base station may apply masking (scrambling) processing to a payload part (for example, the payload part shown in FIG. 11), according to the present invention. In this case, as compared to LTE, although masking (scrambling) processing on a payload part increases, the size of the payload part is short, dozens of bits, so that processing load in terminals increases little. In addition, in this case, it is possible to use the same PDCCHs as in LITE, so that it is possible to construct simple base station and terminals.

In the present invention, masking (scrambling) processing may be bit by bit (that is, CRC bit by terminal ID) multiplication, or a bit and a bit may be added and this adding result may be used to calculate mod 2 (that is, the remainder resulting from dividing the adding result by 2.)

In addition, with the above-described embodiments, a case has been explained where, for PDCCHs to assign uplink data transmitted in an uplink component band, a base station masks CRC bits with the terminal ID matching the uplink component band. However, according to the present invention, when a plurality of downlink component bands are configured, a base station may mask, also for PDCCHs to assign downlink data transmitted in a downlink component band, CRC bits with the terminal ID matching the downlink component hand, like uplink component bands. By this means, it is possible to share processing between the uplink and the downlink to allow simplification of terminals.

In addition, with the above-described embodiments, a case has been explained where a component band is defined as a band having the maximum width of 20 MHz and a basic unit of communication band. However, a component band may be defined as follows. For example, a downlink component band may be defined as a band segmented by downlink frequency band information in a BCH (broadcast channel) notified from a base station, or a band defined by a distribution width in a case in which PDCCHs are distributed and allocated in the frequency domain. In addition, an uplink may be defined as a band segmented by uplink frequency band information in a BCH notified from a base station, or a basic unit of communication band equal to or lower than 20 MHz including PUSCH near the center and PUCCHs (physical uplink control channels) at both ends.

Moreover, although a case has been explained where the communication bandwidth of a component band is 20 MHz, the communication bandwidth of a component band is not limited to 20 MHz.

Furthermore, resource assignment information transmitted on PDCCHs may also be referred to as "DCI (downlink control information)".

In addition, band aggregation may also be referred to as "carrier aggregation." Moreover, a component band may also be referred to as "component carrier." Furthermore, band aggregation is not limited to a case in which consecutive frequency bands are connected, but discontinuous frequency bands may be connected.

In addition, a terminal may also be referred to as "UE", and a base station may also be "Node B" or "BS (base station)". Moreover, a terminal ID may also be referred to as "UE-ID."

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-207369, filed on Aug. 11, 2008, including the specification, drawings and abstract, is incorporated herein by reference in its entirety.

INDUSTRIAL APPLICABILITY

The present invention is applicable to a mobile communication system and so forth.

The invention claimed is:

1. A communication device comprising:
a generating section configured to generate a plurality of control information, each of which includes both resource assignment information indicating a resource allocated to a terminal in each of multiple component carriers (CCs) configured for the terminal and information indicating each of the multiple CCs, in which resources are allocated to the terminal, the multiple CCs having frequencies different from each other; and
a transmitting section configured to transmit the plurality of control information to the terminal on one CC out of the multiple CCs.

2. The communication device according to claim 1, wherein said generating section attaches a CRC scrambled by a terminal ID for each of the plurality of control information.

3. The communication device according to claim 1, wherein said transmitting section transmits the plurality of control information on a given CC out of the multiple CCs.

4. The communication device according to claim 1, wherein the resource assignment information indicates an uplink resource allocated to the terminal.

5. The communication device according to claim 1, wherein the resource assignment information indicates a downlink resource allocated to the terminal.

6. The communication device according to claim 1, wherein multiple uplink CCs and one or multiple downlink CC(s) are configured for the terminal, the number of the downlink CC(s) being less than the number of the uplink CCs, and said transmitting section transmits the plurality of control information, each of which indicates an uplink resource allocated in each of the multiple uplink CCs, on a given downlink CC out of the configured downlink CC(s).

7. The communication device according to claim 1, wherein said transmitting section transmits each of the plurality of control information on a control channel element (CCE) in a search space, which is comprised of a plurality of CCEs and which is specific to each of the multiple CCs.

8. The communication device according to claim 1, wherein said transmitting section is configured to transmit one control information of the plurality of control information to the terminal on the one CC, wherein the one control information indicates a resource allocated in another CC out of the multiple CCs, the another CC being different from said one CC.

9. A method for generating control information, the method comprising:
generating section configured to generate a plurality of control information, each of which includes both resource assignment information indicating a resource allocated to a terminal in each of multiple component carriers (CCs) configured to the terminal and information indicating each of the multiple CCs, in which resources are allocated to the terminal, the multiple CCs having frequencies different from each other; and
transmitting the plurality of control information to the terminal on one CC out of the multiple CCs.

10. The method according to claim 9, wherein the transmitting step includes transmitting one control information of the plurality of control information to the terminal on the one CC, wherein the one control information indicates a resource allocated in another CC out of the multiple CCs, the another CC being different from said one CC.

11. A communication device comprising:
a generating section configured to generate first control information, which includes both resource assignment information indicating a first resource allocated to a terminal in a first component carrier (CC) out of multiple CCs configured for the terminal and information indicating the first CC, in which the first resource is allocated to the terminal, and to generate second control information, which includes both resource assignment information indicating a second resource allocated to the terminal in a second CC out of the multiple CCs and information indicating the second CC, in which the second resource is allocated to the terminal, the first CC and the second CC having frequencies different from each other; and
a transmitting section configured to transmit the first control information and the second control information to the terminal on one out of the first CC and the second CC.

12. The communication device according to claim 11, wherein the transmitting section is configured to transmit the first control information to the terminal on the second CC.

* * * * *